United States Patent
Itoh et al.

(10) Patent No.: US 9,618,056 B2
(45) Date of Patent: Apr. 11, 2017

(54) MOTOR-INCORPORATING ROLLER AND POWER TRANSMISSION MEMBER

(71) Applicant: ITOH DENKI CO., LTD., Kasai-shi, Hyogo (JP)

(72) Inventors: Kazuo Itoh, Kasai (JP); Tatsuhiko Nakamura, Hyogo (JP); Kazuo Miki, Himeji (JP)

(73) Assignee: Itoh Denki Co., Ltd. (JP)

( * ) Notice: Subject to any disclaimer, the term of this patent is extended or adjusted under 35 U.S.C. 154(b) by 0 days.

(21) Appl. No.: 14/956,850

(22) Filed: Dec. 2, 2015

(65) Prior Publication Data
US 2016/0312836 A1    Oct. 27, 2016

(30) Foreign Application Priority Data

Apr. 24, 2015 (JP) .................................. 2015-089866

(51) Int. Cl.
| | |
|---|---|
| *B65G 13/06* | (2006.01) |
| *F16D 3/64* | (2006.01) |
| *F16D 3/04* | (2006.01) |
| *F16D 3/68* | (2006.01) |
| *F16D 1/08* | (2006.01) |

(52) U.S. Cl.
CPC .................. *F16D 3/64* (2013.01); *F16D 3/04* (2013.01); *F16D 3/68* (2013.01); *F16D 1/0835* (2013.01)

(58) Field of Classification Search
CPC ........ B65G 23/08; B65G 13/06; B65G 13/02; B65G 13/04
USPC .............................. 198/788, 789, 780, 781.08
See application file for complete search history.

(56) References Cited

U.S. PATENT DOCUMENTS

| | | | |
|---|---|---|---|
| 7,207,433 B2 | 4/2007 | Schaefer | |
| 8,282,535 B2 * | 10/2012 | Huang ................ | A63B 22/0235 198/788 |
| 8,381,901 B2 * | 2/2013 | Yamamoto ............. | B65G 13/02 198/788 |
| 9,248,971 B2 * | 2/2016 | Wolters .................. | B65G 23/08 |

(Continued)

FOREIGN PATENT DOCUMENTS

WO    WO-2014/057984 A1    4/2014

OTHER PUBLICATIONS

Search Report issued by the UK Patent Office on Apr. 21, 2016 in Appliccation No. GB1520856.4.

*Primary Examiner* — James R Bidwell
(74) *Attorney, Agent, or Firm* — Wood, Phillips, Katz, Clark & Mortimer

(57) ABSTRACT

The power transmission member includes a connecting member, an intermediate member, and an engagement member. The connecting member has an annular portion. The outer peripheral surface of the annular portion is provided with arc-like portions, and the inner peripheral surface of the annular portion is provided with concave-convex portions. The engagement member includes protrusions and a shaft insertion hole. The arc-like portions of the connecting member are in contact with the inner peripheral surface of the roller body, and the connecting member and the roller body are also secured together by securing means. The intermediate member engages with the concave-convex portions and the protrusions, the shaft insertion hole of the engagement member is maintained at the center of the roller body, and a power unit engages with the shaft insertion hole.

20 Claims, 21 Drawing Sheets

(56) References Cited

U.S. PATENT DOCUMENTS

2004/0112718 A1* 6/2004 Brixius .................. F16B 21/09
198/788
2012/0273328 A1* 11/2012 Sejourne ................ B65G 39/12
198/788

* cited by examiner

MOTOR-INCORPORATING ROLLER AND POWER TRANSMISSION MEMBER

TECHNICAL FIELD

The present invention relates to a motor-incorporating roller having a power transmission member. The present invention also relates to one of the components constituting a motor-incorporating roller and, more particularly, to a power transmission member for transmitting the power of a motor to a roller.

BACKGROUND ART

A motor-incorporating roller is known as a component for a roller conveyor or the like. A motor-incorporating roller includes a motor and a speed reducer in its roller body and rotates the roller body on the outside by driving the motor on the inside. More specifically, the motor-incorporating roller is provided with a power transmission member for transmitting the power of the motor to the roller body and is configured to transmit a rotational force of the motor to the roller body through the power transmission member.

Incidentally, most power transmission members for transmitting the power to the roller body are conventionally configured to be integrally secured onto the inner wall of the roller body in terms of power transmission efficiency, easy productivity, and the like, for example as disclosed in Patent Document 1 (U.S. Pat. No. 7,207,433). A method of press-fitting a power transmission member into a roller body is conventionally known as a method of securing a power transmission member to a roller body.

PRIOR ART DOCUMENT

Patent Document

Patent Document 1: U.S. Pat. No. 7,207,433

DISCLOSURE OF INVENTION

Technical Problems

The above-described press-fit power transmission member has a simple structure and is also easy to assemble.

However, the press-fit power transmission member may not be secured to the roller body or power transmission capacity to the roller body may be insufficient due to variations in manufacturing of the roller body, in particular, variation in the inner diameter of the roller body.

That is, if the inner diameter of the roller body is large to some extent, a contact force between the roller body and the power transmission member is insufficient and a friction force is less likely to act between the roller body and the power transmission member so that the power transmission member will idle in the roller body.

In other words, in order to generate an adequate friction force between the roller body and the power transmission member, the inner peripheral surface of the roller body and the outer peripheral surface of the power transmission member need to be accurately machined. The outer diameter of the power transmission member needs to be somewhat slightly larger than the inner diameter of the roller body.

However, even if the outer diameter of the power transmission member is machined to be an appropriate size for the inner diameter of the roller body, the friction force between the roller body and the power transmission member decreases due to secular change and they rotate relative to each other during use of the motor-incorporating roller.

Moreover, while the roller body contains some manufacturing errors and there is variations in the inner diameter of each roller body, a drive shaft of the motor-incorporating roller is disposed in the center of the roller body and the power transmission member has to be disposed in the center of the roller body so that the center of the power transmission member also aligns with the drive shaft. That is, the center of the power transmission member needs to be aligned with the center of each roller body so as to be adapted for roller bodies having variation in the inner diameter thereof.

Accordingly, an object of the present invention, which has been made in view of the foregoing problems in the prior art, is to provide a power transmission member which can be firmly secured to a roller body and the center of which can be aligned with the center of the roller body even if there is variation in manufacturing of the roller body and to provide a motor-incorporating roller including such a power transmission member.

Solution to Problem

A first aspect of the present invention to solve the above problems provides a motor-incorporating roller including a hollow roller body, a power unit including a motor, and a power transmission member, the power unit and the power transmission member being contained within the roller body, and a rotational force of the power unit being transmitted to the roller body through the power transmission member, wherein the power transmission member includes a connecting member that includes an annular portion, part or all of the outer peripheral surface thereof is provided with an arc-like portion, and the inner peripheral surface thereof is provided with a concave-convex portion, an intermediate member having elasticity, and an engagement member including an outer engagement portion and an inner engagement portion, wherein the connecting member, the intermediate member, and the engagement member are separate from the roller body, wherein the arc-like portion on the outer peripheral surface of the connecting member is in contact with the inner peripheral surface of the roller body, and the connecting member is secured within the roller body by securing means, the securing means being at least one of bonding, welding, fastening element, and mechanical engagement obtained by recessing the roller body, wherein the intermediate member engages with the concave-convex portion of the connecting member and the outer engagement portion of the engagement member to maintain the inner engagement portion of the engagement member at the center of the roller body, and wherein the power unit engages with the inner engagement portion of the engagement member.

According to the present aspect, the power of the power unit can be reliably transmitted from the connecting member of the power transmission member to the hollow roller body through the securing means, which is at least one of bonding, welding, fastening element, and mechanical engagement obtained by recessing the roller body, regardless of friction. The fastening element includes a rivet, pin, screw, etc.

In the present aspect, since the inner peripheral surface side of the annular portion of the connecting member is provided with the concave-convex portion, the engagement member has the outer engagement portion, and the intermediate member engages with the concave-convex portion of the connecting member and the outer engagement portion of the engagement member, the connecting member, the intermediate member, and the engagement member of the power transmission member cannot rotate relative to one another.

Also, since the power unit engages with the inner engagement portion of the engagement member, the power unit transmits power to the power transmission member. Therefore, when the power unit transmits power to the engagement member, the connecting member, the intermediate member, and the engagement member rotate integrally.

The arc-like portion on the outer peripheral surface of the connecting member is in contact with the inner peripheral surface of the roller body and the connecting member is integrally secured within the roller body by the mechanical engagement obtained by recessing the roller body and/or the fastening element so that the power is reliably transmitted to the roller body through the power transmission member upon operation of the power unit and, thus, the roller body rotates. That is, since the connecting member and the roller body are secured integrally at least so as not to rotate relatively to each other, the power is reliably transmitted between the two.

The intermediate member is elastic and engages with the concave-convex portion of the connecting member and the outer engagement portion of the engagement member, and the inner engagement portion of the engagement member is maintained at the center of the roller body, thereby engaging the inner engagement portion of the engagement member with the power unit. That is, if the center of the roller body and the center of the power transmission member are not coincident, the intermediate member elastically deforms and compensates for misalignment so that the inner engagement portion of the engagement member can be engaged with the power unit with the center of the power transmission member and the center of the roller body being aligned with each other.

The connecting member is preferably deformable. In particular, it is desirable for the connecting member to be radially contractible.

According to this preferable aspect, deformability of the connecting member allows the connecting member to easily conform to the inner peripheral surface of the hollow roller body. That is, when the inner diameter of the roller body is smaller than the connecting member, the connecting member is allowed to deform and to enter the roller body.

Preferably, the annular portion of the connecting member includes a plurality of the arc-like portions each of which is arranged at a plurality of positions on the same circumference, and a plurality of recesses each of which is recessed radially inwardly from the annular portion, wherein the arc-like portions adjacent to each other are connected by the recess.

According to this preferable aspect, when the connecting member is pressed against the inner surface of the hollow roller body, the recesses undergo deformation and the arc-like portions come closer to each other so that the connecting member can be easily reduced in diameter and disposed within the roller body.

The fastening element is preferably a rivet.

According to this preferable aspect, the connecting member can be easily connected to the roller body. The connecting member can also be inexpensively connected to the roller body.

The connecting member preferably includes an inner protrusion that is contiguous with at least the arc-like portion of the annular portion and extends radially inwardly.

According to this preferable aspect, the arc-like portion of the connecting member is reinforced. That is, the arc-like portion would be less likely to deform if an external force is applied radially inwardly to the arc-like portion. The roller body and the connecting member are easily secured by the securing means, accordingly.

An annularly continuous inner protrusion constituting an inward flange improves the rigidity of the entire connecting member.

Preferably, the annular portion of the connecting member includes a plurality of arc-like portions that are provided with an inner wall contiguous with the arc-like portion at an axial end thereof and that extend radially inwardly, and a plurality of recesses which are provided with no inner wall, or an inner wall smaller than that of the arc-like portion, wherein the arc-like portions and the recesses are annularly connected.

According to this aspect, an elasticity of the recess can be made different from an elasticity of the arc-like portion. In other words, the elasticity of the recess can be made smaller than that of the arc-like portion. Consequently, when the annular portion is reduced in diameter by compression, the arc-like portion maintains an arc-like shape and the recess undergoes deformation. As such, the arc-like shape makes tight contact with the roller body when the connecting member is inserted into the roller body.

Preferably, the annular portion of the connecting member includes a plurality of arc-like portions and a plurality of recesses more easily elastically deformable compared to the arc-like portion, wherein the arc-like portions and the recesses are annularly connected.

According to this aspect, the arc-like shape makes tight contact with the roller body when the connecting member is inserted into the roller body.

Preferably, the annular portion of the connecting member includes a plurality of arc-like portions and a plurality of recesses, the arc-like portions and the recesses are annularly connected, and the recess is arc-like in shape.

According to this aspect, when the connecting member is inserted into the roller body, each part of the recess deforms uniformly and the arc-like shape is likely to be maintained.

The connecting member is desirably disposed within the roller body with the annular portion being radially compressed.

Preferably, the outer peripheral surface of the intermediate member is provided with a plurality of protrusions protruding radially outwardly and a plurality of retraction portions retracting radially inwardly, and the protrusions adjacent to each other are connected by the retraction portion, wherein the protrusion and the retraction portion of the intermediate member engage with the corresponding concave-convex portion of the connecting member.

According to this preferable aspect, a rotational force can be reliably transmitted between the intermediate member and the connecting member regardless of friction.

A second aspect of the present invention provides a power transmission member that is contained within a hollow roller body of a motor-incorporating roller and transmits a rotational force from an output shaft of a power unit including a motor disposed within the roller body to the roller body, the power transmission member including a connecting member that includes an annular portion, part or all of the outer peripheral surface thereof is provided with an arc-like portion, and the inner peripheral surface thereof is provided with a concave-convex portion, an intermediate member having elasticity, and an engagement member including an outer engagement portion and an inner engagement portion, wherein the connecting member, the intermediate member, and the engagement member are separate from the roller body, wherein the arc-like portion on the outer peripheral surface of the connecting member is in contact with the inner peripheral surface of the roller body, and the connecting member is secured within the roller body by securing means, the securing means being at least one of bonding, welding, fastening element, and mechanical engagement obtained by recessing the roller body, wherein the intermediate member engages with the concave-convex portion of the connecting member and the outer engagement portion of the engagement member to maintain the inner engagement portion of the engagement member at the center of the roller body, and wherein the power unit engages with the inner engagement portion of the engagement member.

According to the second aspect of the present invention, the connecting member of the power transmission member is firmly and integrally secured within the roller body by the securing means, which includes at least one of bonding, welding, fastening element, and mechanical engagement obtained by recessing the roller body. Furthermore, the elastic deformation of the intermediate member allows the power transmission member to be aligned with the center of the roller body and, thus, the power of the power unit can be reliably transmitted from the connecting member of the power transmission member to the hollow roller body.

The connecting member of the power transmission member is preferably deformable.

Preferably, the annular portion of the connecting member of the power transmission member includes a plurality of the arc-like portions arranged at a plurality of positions on the same circumference and a plurality of recesses each of which is recessed radially inwardly from the annular portion, wherein the arc-like portions adjacent to each other are connected by the recess.

The fastening element of the power transmission member is desirably a rivet.

The connecting member of the power transmission member desirably includes an inner protrusion that is contiguous with at least the arc-like portion of the annular portion and extends radially inwardly.

Preferably, the annular portion of the connecting member of the power transmission member includes a plurality of arc-like portions that are provided with an inner wall contiguous with the arc-like portion at an axial end thereof and that extend radially inwardly and a plurality of recesses which are provided with no inner wall, or an inner wall smaller than that of the arc-like portion, wherein the arc-like portions and the recesses are annularly connected.

Preferably, the annular portion of the connecting member of the power transmission member includes a plurality of arc-like portions and a plurality of recesses, the arc-like portions and the recesses are annularly connected, and each of the recesses is easily elastically deformable compared to the arc-like portion.

Preferably, the annular portion of the connecting member of the power transmission member includes a plurality of arc-like portions and a plurality of recesses, the arc-like portions and the recesses are annularly connected, and each of the recesses is arc-like in shape.

Preferably, the outer peripheral surface side of the intermediate member of the power transmission is provided with a plurality of protrusions protruding radially outwardly and a plurality of retraction portions retracting radially inwardly, the protrusions adjacent to each other are connected by the retraction portion, and the protrusions and the retraction portions of the intermediate member engage with the corresponding concave-convex portions of the connecting member.

Effect of Invention

The use of the motor-incorporating roller of the present invention allows the power of the power unit to be reliably transmitted from the connecting member of the power transmission member to the hollow roller body regardless of friction.

Additionally, the use of the power transmission member of the present invention allows the power of the power unit to be reliably transmitted to the hollow roller body regardless of friction.

DESCRIPTION OF EMBODIMENT

A motor-incorporating roller according to an embodiment of the present invention will now be described.

A motor-incorporating roller 1 of the present embodiment is characterized by a power transmission member 2 for transmitting a driving force of a motor 12 to a roller body 11, and the rest of the basic structure are similar to that known in the art. First, the basic structure of the motor-incorporating roller 1 is simply described.

Figure 1:
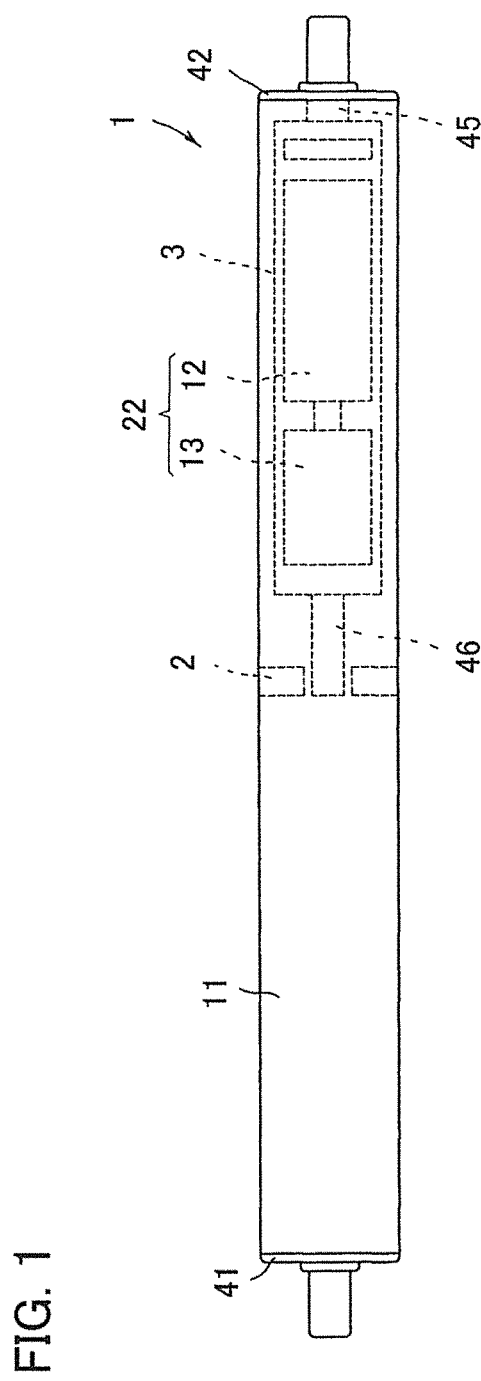
FIG. 1 is a front view of a motor-incorporating roller according to an embodiment of the present invention.
Figure 2:
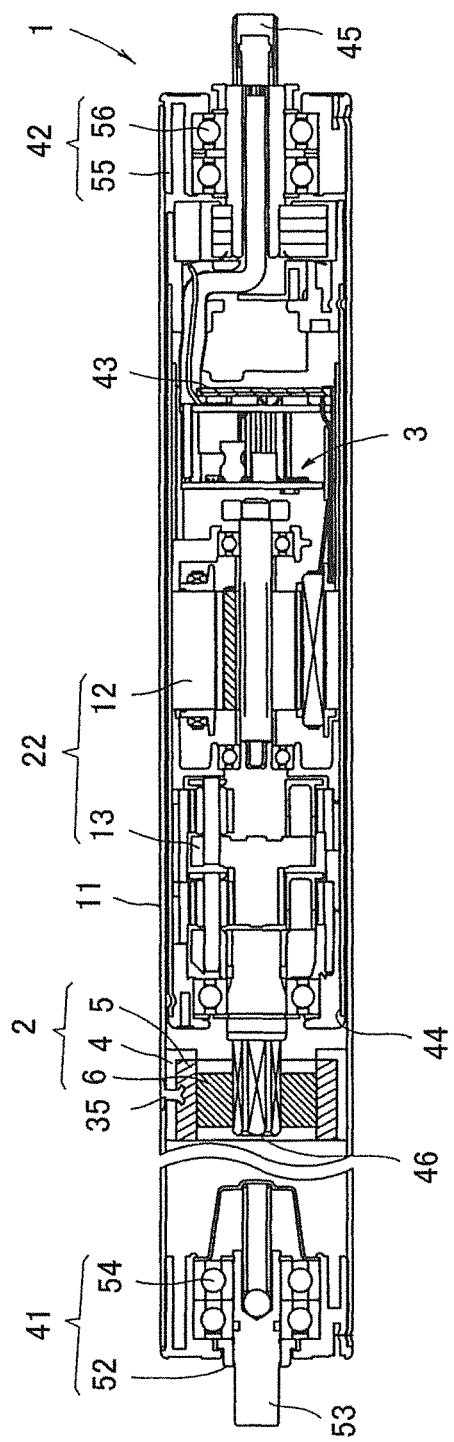
FIG. 2 is a sectional view of the motor-incorporating roller in FIG. 1.
Figure 3:
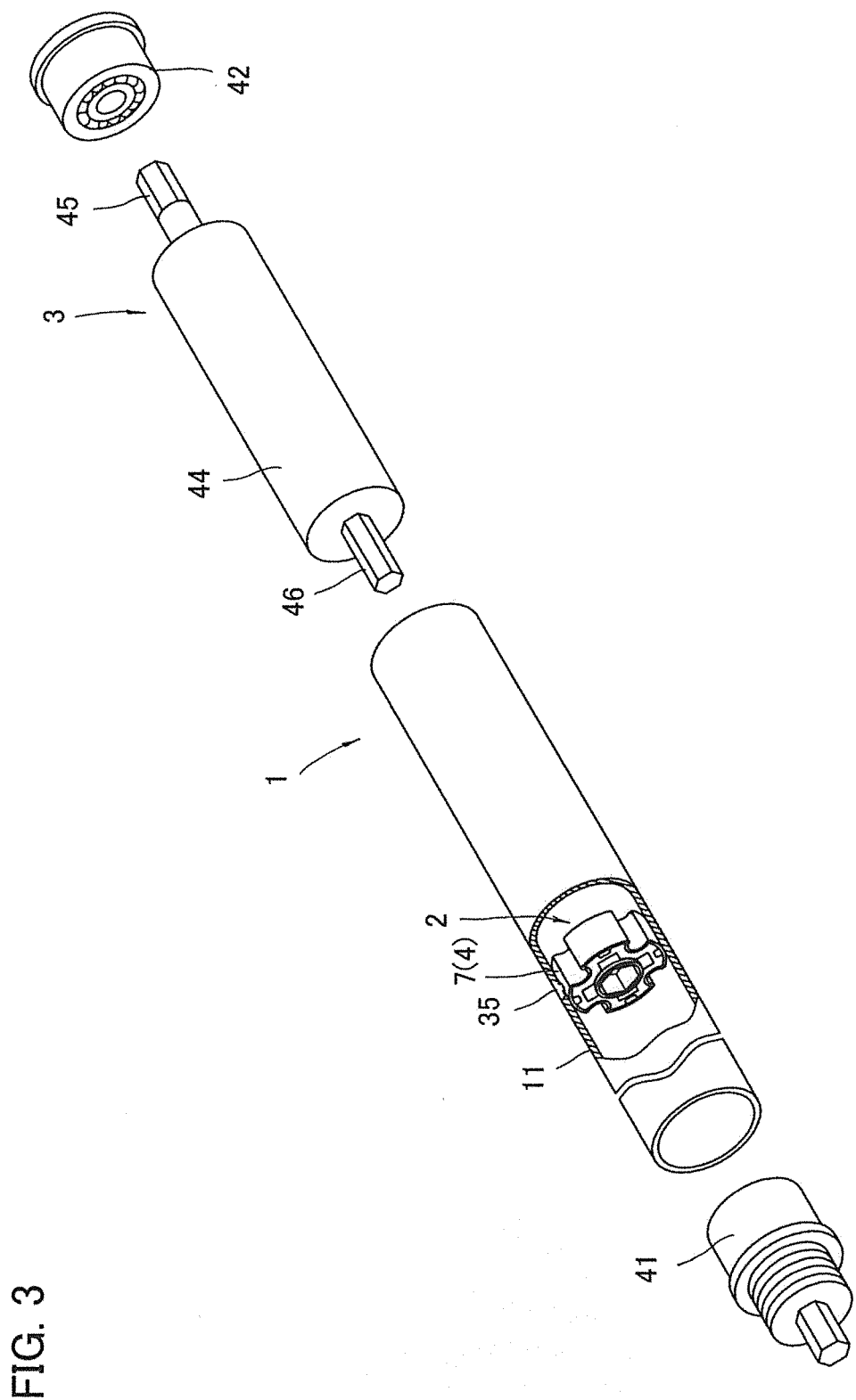
FIG. 3 is an exploded perspective view of the motor-incorporating roller in FIG. 1.

As illustrated in FIGS. 1 to 3, the basic structure of the motor-incorporating roller 1 includes a hollow cylindrical roller body 11 and cover members 41, 42 and is configured to have a power unit 22 including a motor 12 and a speed reducer 13 therein. In the embodiment, the motor 12, the speed reducer 13, and a circuit board 43 are integrated into a motor unit 3, which is contained within the roller body 11. Part of the motor unit 3 constitutes the power unit 22 in the embodiment.

The roller body 11 is a cylinder with both ends open. The cover members 41 and 42 are attached so as to cover both ends of the roller body 11.

As illustrated in FIG. 2, the cover member 41 (on the left side in FIG. 2) includes a combined roller body fitting member 52, bearing 54, and body-side shaft member 53. The other cover member 42 (on the right side in FIG. 2) includes a combined roller body fitting member 55 and bearing 56. The body-side shaft member 53 has a cross-section, part or all of which is not circular. The cross-section is approximately hexagonal in the embodiment.

Figure 4:
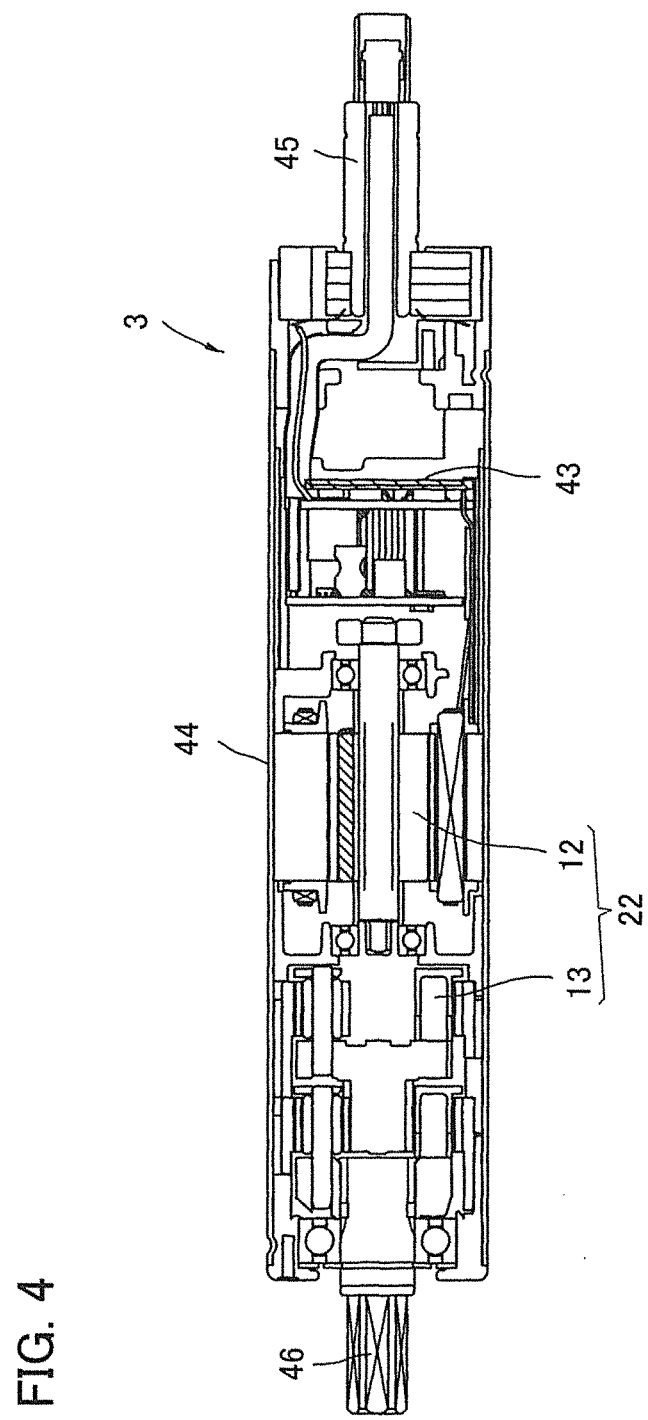
FIG. 4 is a sectional view of a motor unit contained within the motor-incorporating roller in FIG. 1.

As illustrated in FIGS. 2 to 4, the motor unit 3 includes a cylindrical case 44, and the motor 12, the speed reducer 13, and the circuit board 43 are contained within the case 44. The case 44 has therein a fixed-side shaft 45 extending outwardly from one axial end and a drive-side shaft 46 (power unit) extending outwardly from the other axial end.

The fixed-side shaft 45 is a shaft that is inserted into the bearing 56 of the other cover member 42 with the motor unit 3 disposed within the roller body 11, serving as a body-side shaft member of the roller body 11.

The drive-side shaft 46 is a shaft that is connected to a power transmission member 2, described below, with the motor unit 3 disposed within the roller body 11, serving as a rotational shaft that outputs the power of the power unit 22 to the roller body 11.

Note that both the fixed-side shaft 45 and the drive-side shaft 46 have an approximately hexagonal cross-section.

A power transmission member 2 as a feature of the invention will now be described.

Figure 5:
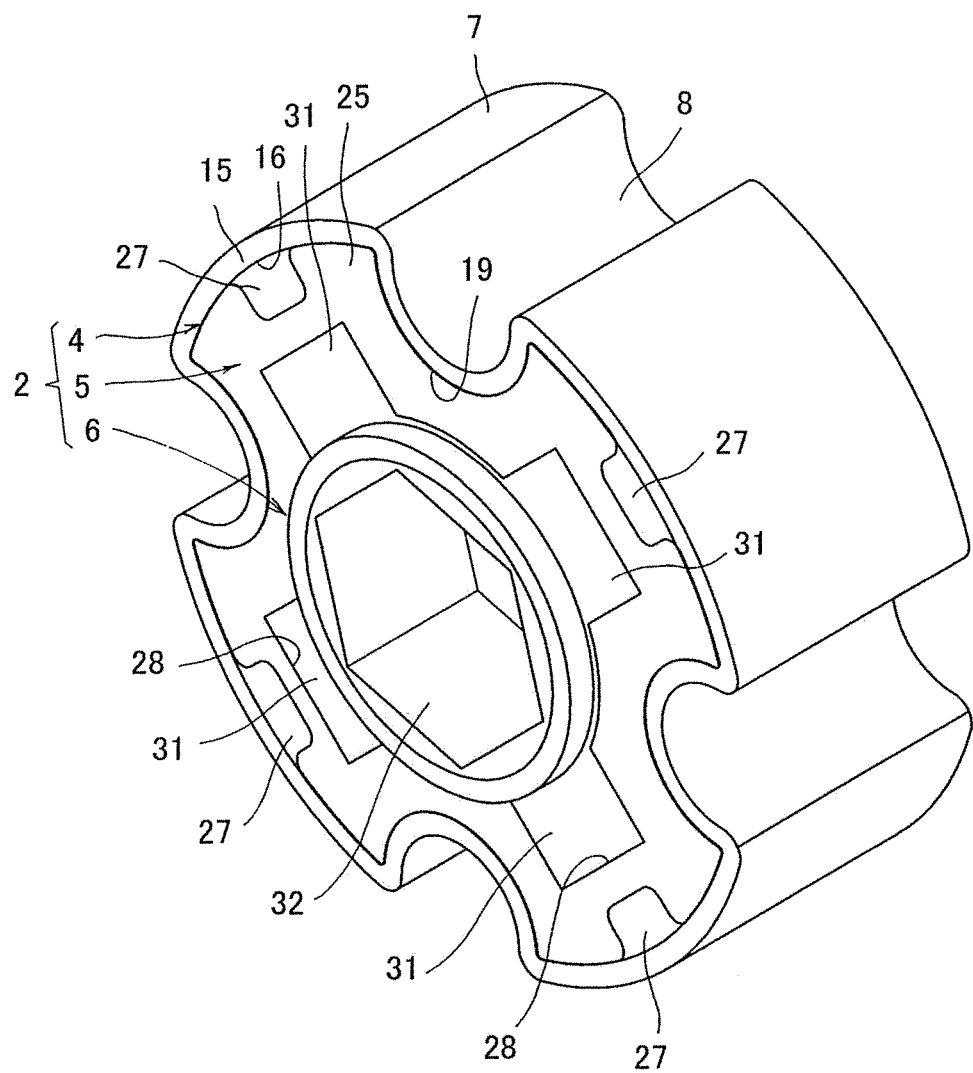
FIG. 5 is a perspective view of a power transmission member.
Figure 6A:
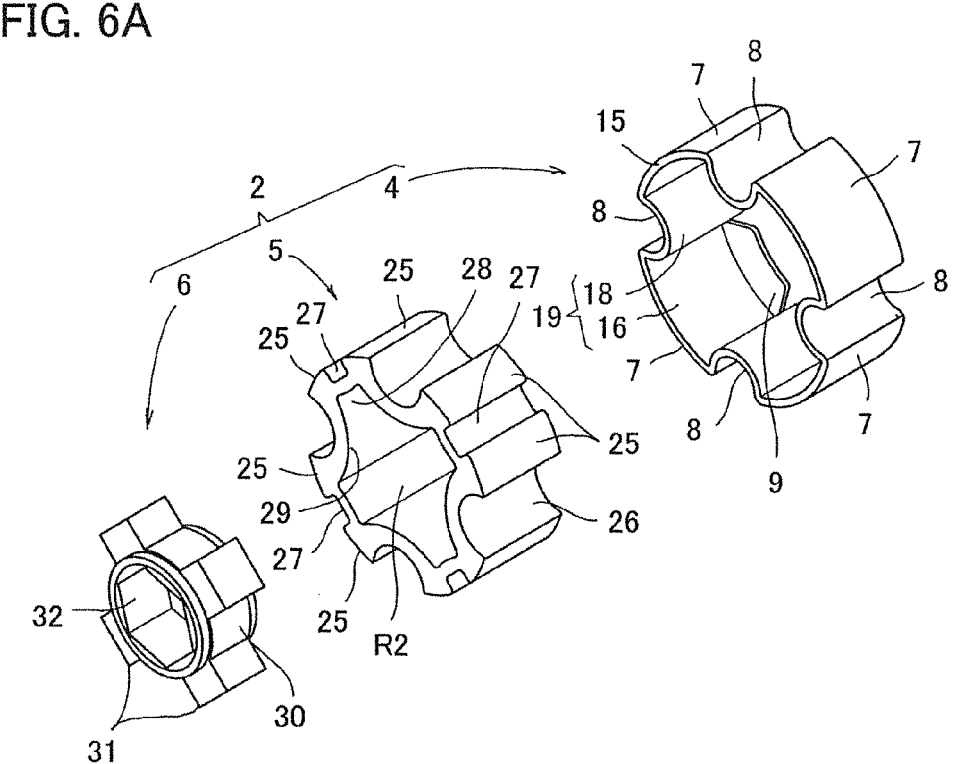
FIG. 6A is an exploded perspective view of the power transmission member in FIG. 5.
Figure 6B:
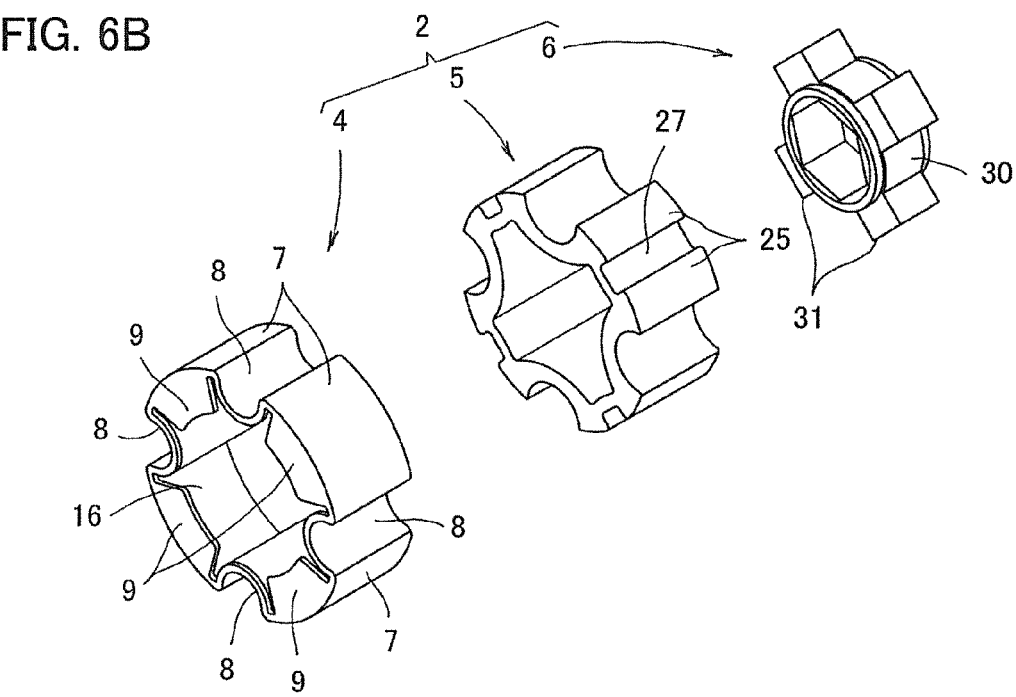
FIG. 6B is an exploded perspective view of the power transmission member of FIG. 6A viewed from a different direction.

The power transmission member 2 of the embodiment is a member that is disposed within the roller body 11 of the motor-incorporating roller 1 and transmits the power of the motor 12 to the roller body 11. In order to perform its function, the power transmission member 2 includes a concave-convex member 4 (connecting member), an intermediate member 5, and an engagement member 6 as illustrated in FIG. 5 and FIGS. 6A-6B.

The concave-convex member 4 is made of a rigid metal such as steel, zinc, or aluminum. The concave-convex member 4 is an annular or cylindrical hollow member. The concave-convex member 4 has a portion protruding radially outwardly and a portion recessed radially inwardly.

Specifically, the concave-convex member 4 includes a plurality of arc-like protrusions 7, recesses 8 recessed radially inwardly, and inner protrusions 9. In the embodiment, the concave-convex member 4 includes four arc-like protrusions 7, four recesses 8, and four inner protrusions 9.

The outer periphery of the arc-like protrusion 7 has an outwardly convex arc-like surface. The outer periphery of the recess 8 has an inwardly convex arc-like surface.

The arc-like protrusion 7 (arc-like portion) is a portion that protrudes radially outwardly on the annular concave-convex member 4. The outer periphery of the arc-like protrusion 7 has a curved surface that is convex radially outwardly. The arc-like protrusions 7 are provided at four positions on the circumference of the concave-convex member 4. While the arc-like protrusions 7 are preferably disposed on the same circumference, there may be some manufacturing errors in many cases.

The inner periphery of the arc-like protrusion 7 provides a concave curved surface 16. The thickness, i.e., a distance between the outer and inner peripheral surfaces, of the arc-like protrusion 7 is thin so that a rivet 35, described below, can penetrate it.

The recesses 8 are contiguous with the arc-like protrusion 7 on both circumferential sides of the concave-convex member 4. The recess 8 is a portion that is recessed on the outer peripheral side of the annular concave-convex member 4, and the recesses 8 are provided at four positions on the circumference of the concave-convex member 4.

The outer periphery of the recess 8 has a concave curved surface. That is, the recess 8 is recessed radially inwardly relative to the arc-like protrusion 7.

The inner peripheral surface of the recess 8 protrudes radially inwardly and provides a convex surface 18 on the inner peripheral side of the concave-convex member 4.

The arc-like protrusions 7 and the recesses 8 are alternately arranged in the circumferential direction to be annularly continuous, thereby forming an annular portion 15.

That is, the concave-convex member 4 has a structure in which it protrudes radially outwardly at the arc-like protrusions 7 and it is recessed radially inwardly at the recesses 8. On the other hand, the concave surface 16 being the inner peripheral surface of the arc-like protrusion 7 is contiguous with the convex surface 18 being the inner peripheral surface of the recess 8 inside the concave-convex member 4, which forms a concave-convex portion 19.

The inner protrusion 9 is a plate-shaped portion that is contiguous with the arc-like protrusion 7. In the embodiment, the inner protrusion 9 is contiguous with the arc-like protrusion 7 and extends radially inwardly to form an inner wall. The inner wall, located at the axial end of the arc-like protrusion 7, is contiguous with the arc-like protrusion 7 and extends radially inwardly.

A surface constituting the inner protrusion 9 intersects a surface constituting the arc-like protrusion 7 and extends radially inwardly of the concave-convex member 4 from an end of the arc-like protrusion 7. The inner protrusions 9 are disposed on the same end side of the arc-like protrusions 7. That is, each inner protrusion 9 is configured such that a plurality of sections (four sections) of an inward annular flange are radially cut away. In other words, the inner protrusions 9 have a structure such that the inward annular flange is provided with a plurality of slits extending radially.

The inner protrusion 9 functions as a rib reinforcing the arc-like protrusion 7. That is, the arc-like protrusion 7 would be less likely to deform if an external force is applied radially inwardly to the arc-like protrusion 7. On the other hand, since the recess 8 has no member corresponding to the inner protrusion 9, the recess 8 is subject to elastic deformation compared to the arc-like protrusion 7.

The concave-convex member 4 has an annular configuration formed of a thin plate member as described above and the inside of the annular portion 15 is provided with an intermediate member receiving region R1. The above-described concave-convex portion 19 is a part of the intermediate member receiving region R1.

The intermediate member 5 is then described.

The intermediate member 5 is made of an elastic material such as rubber and is a short cylindrical body having an annular configuration as illustrated in FIGS. 6A and 6B. The outer shape of the intermediate member 5 is substantially similar to a contour of the intermediate member receiving region R1 of the concave-convex member 4 and is sized slightly smaller than the intermediate member receiving region R1. The width of the intermediate member 5 is sized such that it can be disposed within the intermediate member receiving region R1 of the concave-convex member 4.

The intermediate member 5 includes protrusions 25 and retraction portions 26. That is, the intermediate member 5 includes protrusions 25 protruding radially outwardly at a plurality of positions (four positions) on the circumference and retraction portions 26 retracting radially inwardly at a plurality of positions (four positions) on the circumference.

The protrusion 25 is a portion that protrudes radially outwardly on the outer peripheral surface of the intermediate member 5 having an annular configuration. As illustrated in FIGS. 6A-6B, the protrusion 25 has a groove 27. The groove 27 extends in the width direction of the intermediate member 5.

The inner peripheral side of the protrusion 25 of the intermediate member 5 is provided with a concave portion 28.

The retraction portion 26 is a portion that is recessed radially inwardly of the outer peripheral surface of the annular intermediate member 5. The outer surface of the retraction portion 26 is concave. The retraction portion 26 connects protrusions 25 adjacent to the retraction portion 26.

The inner peripheral side of the retraction portion 26 of the intermediate member 5 is provided with a convex portion 29 protruding radially inwardly.

The inside of the annular intermediate member 5 is provided with an engagement member receiving region R2 defined by the concave portions 28 and the convex portions 29. The engagement member receiving region R2 provides an inner engagement portion of the intermediate member 5. The engagement member receiving region R2 can be expanded by applying an external force.

The protrusions 25 and the retraction portions 26 of the intermediate member 5 constitute an outer engagement portion. The outer shape of the intermediate member 5 is substantially similar to a space that the intermediate member receiving region R1 of the concave-convex member 4 occupies. The intermediate member 5 is sized slightly smaller than the intermediate member receiving region R1.

The engagement member 6 is then described.

The engagement member 6 is made of a rigid metal such as steel, zinc, or aluminum. The width of the engagement member 6 is sized such that it can be disposed within the engagement member receiving region R2 of the intermediate member 5. The engagement member 6 includes a cylindrical main body 30 and four protrusions 31 (outer engagement portions).

The cylindrical main body 30 is a cylindrical portion, the inside of which is provided with a shaft insertion hole 32 (inner engagement portion). The shaft insertion hole 32 is a polygonal hole (e.g., a hexagonal hole).

The protrusion 31 is a substantially rectangular prismatic portion, which is integrally secured to the outer peripheral surface of the cylindrical main body 30 and extends radially outwardly. In the embodiment, the four protrusions 31 are secured to the outer peripheral surface of the cylindrical main body 30 at equal angular intervals.

The appearance of the engagement member 6 is substantially similar to the engagement member receiving region R2 of the intermediate member 5. The engagement member 6 is sized slightly larger than a space that the engagement member receiving region R2 occupies.

The power transmission member 2 is constructed by combining the concave-convex member 4, the intermediate member 5, and the engagement member 6. That is, the intermediate member 5 is inserted into the intermediate member receiving region R1 of the concave-convex member 4, and the engagement member 6 is press-fit into the engagement member receiving region R2 of the intermediate member 5.

The intermediate member 5 is elastically deformable and is inserted into the intermediate member receiving region R1 of the concave-convex member 4 while being elastically deformed.

While the engagement member 6 is rigid, the inner wall surface of the intermediate member 5 forming the engagement member receiving region R2 is elastically deformable. The engagement member 6 is press-fit into the engagement member receiving region R2 by expanding the inner wall of the intermediate member 5.

Since the intermediate member 5 is sized slightly smaller than the intermediate member receiving region R1 in the foregoing example, the intermediate member 5 can be smoothly inserted into the intermediate member receiving region R1 of the concave-convex member 4.

Alternatively, the intermediate member 5 may be press-fit into the intermediate member receiving region R1 of the concave-convex member 4 with the intermediate member 5 sized slightly larger than the intermediate member receiving region R1.

All of the concave-convex member 4, the intermediate member 5, and the engagement member 6 of the power transmission member 2 are annular in shape and the engagement member 6 is mounted in the concave-convex member 4 through the intermediate member 5. Consequently, the center of the shaft insertion hole 32 of the engagement member 6 can be moved slightly eccentrically by elastic formation of the intermediate member 5.

That is, if the center of the shaft insertion hole 32 of the engagement member 6 and the center of the roller body 11 (i.e., the center of rotation of the drive-side shaft 46) are not coincident with no external force applied to the intermediate member 5, the elastic deformation of the intermediate member 5 subjected to an external force moves the position of the engagement member 6 so that the center of the shaft insertion hole 32 of the engagement member 6 and the center of rotation of the drive-side shaft 46 can be aligned with each other. The drive-side shaft 46 disposed in the center of the roller body 11 is inserted into the shaft insertion hole 32 of the engagement member 6.

Procedures for securing the power transmission member 2 to the roller body 11 will now be described.

Figure 7A:
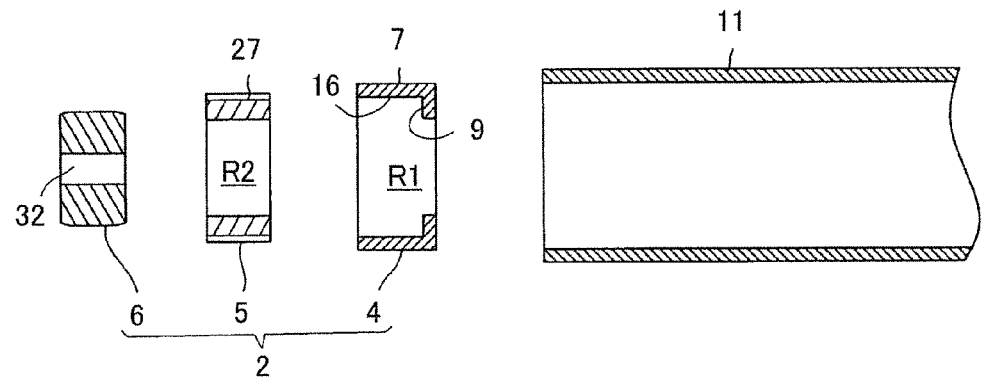
FIGS. 7A-7C are sectional views of the power transmission member to be mounted in a roller body and illustrate a procedure for mounting a concave-convex member in a roller body, where a rivet penetrates the roller body and recesses the concave-convex member.
Figure 15A:
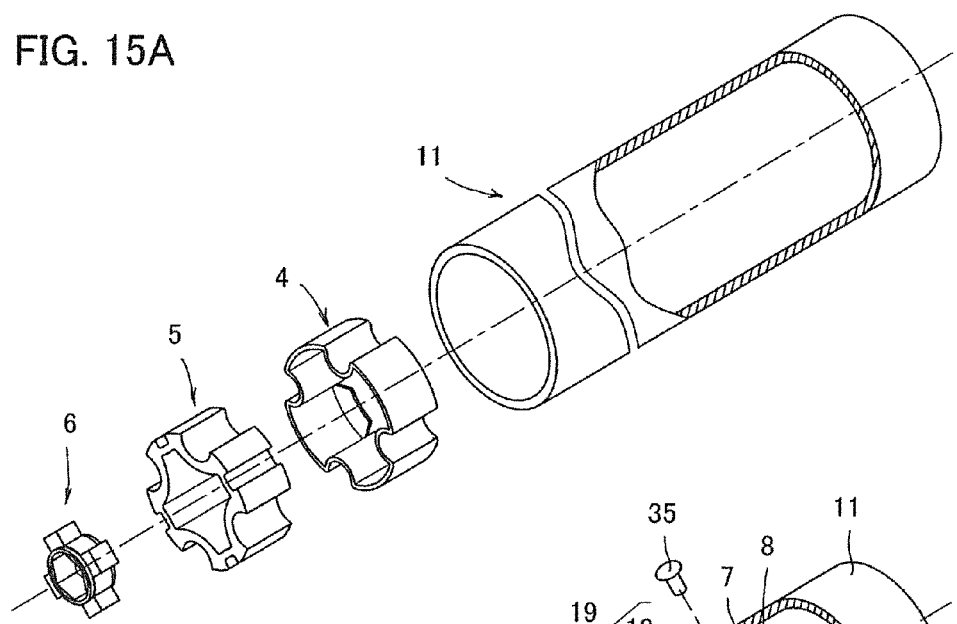
FIGS. 15A-15C are partially sectional perspective views of the power transmission member to be mounted in the roller body and illustrate the procedure for mounting the concave-convex member in the roller body.

As illustrated in FIGS. 7A and 15A, the concave-convex member 4, the intermediate member 5, and the engagement member 6 constituting the power transmission member 2 are present separately, i.e., are not combined with each other.

Figure 11A:
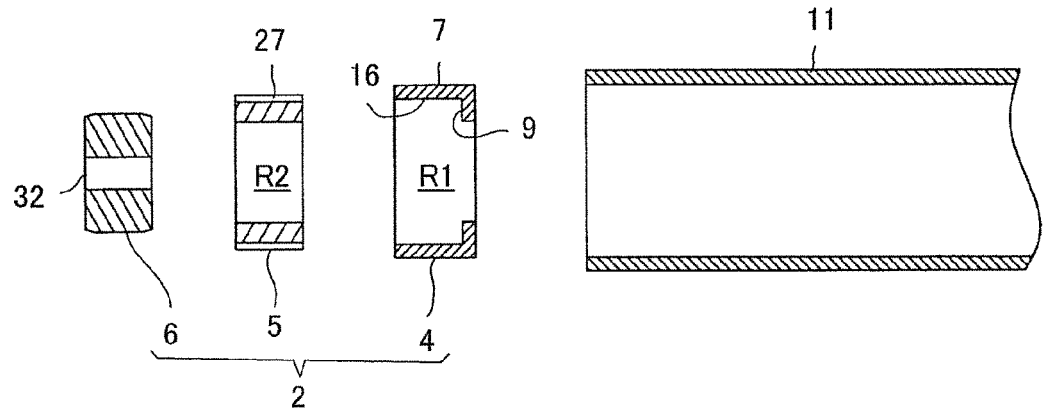
FIGS. 11A-11C are sectional views of the power transmission member to be mounted in a roller body and illustrate a procedure for mounting a concave-convex member in a roller body, where a rivet penetrates the concave-convex member.

First, only the concave-convex member 4 is placed at a desired position in the roller body 11. The desired position in the roller body 11 is a position at which the drive-side shaft 46 (power unit) shown in FIG. 1 is placed. The drive-side shaft 46 is not shown for convenience in FIGS. 11A-11C.

Here, assuming the outer diameter of the concave-convex member 4 is slightly larger than the inner diameter of the roller body 11, the concave-convex member 4 is allowed to deform and to enter the roller body 11. That is, the concave-convex member 4 includes the arc-like protrusions 7 and the recesses 8, and when the arc-like protrusions 7 are pressed against an inner peripheral surface 11a of the roller body 11, the recesses 8 undergo deformation and the arc-like protrusions 7 get close to each other, which reduces the diameter of the concave-convex member 4. In other words, the arc-like protrusions 7 move radially inwardly.

That is, while the material making up the concave-convex member 4 is a rigid material such as metal, the provision of the arc-like protrusions 7 and the recesses 8 allows the concave-convex member 4 to deform slightly.

However, since the recess 8 is easily deformable compared to the arc-like protrusion 7 as described above, the concave-convex member 4 reduces its diameter while maintaining the arc-like shape of the arc-like protrusion 7 and is mounted in the inner peripheral surface 11a of the roller body 11.

The arc-like protrusion 7 maintains a shape conforming to the inner peripheral surface 11a of the roller body 11 in the embodiment so that the arc-like protrusion 7 is in close contact with the inner peripheral surface 11a of the roller body 11. The concave-convex member 4 will be disposed within the roller body under radial compression accordingly.

Figure 7B:
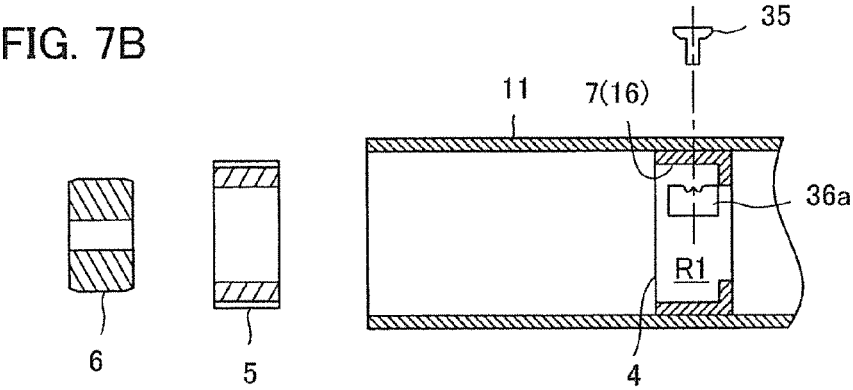
Figure 15B:
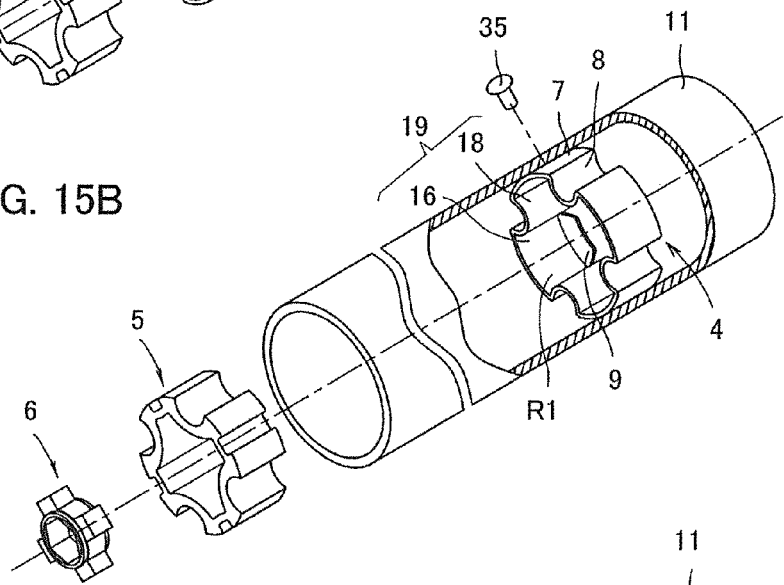
Figure 17A:
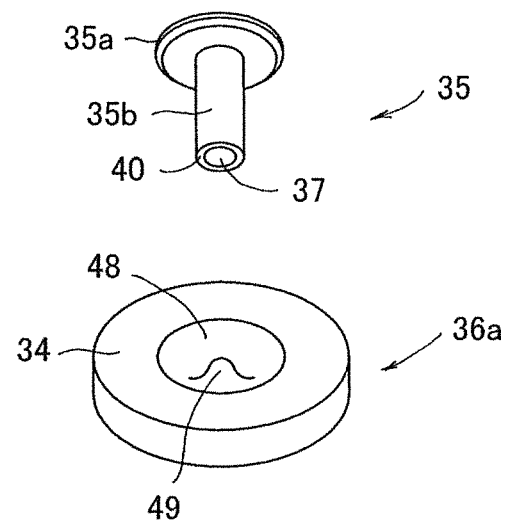
FIG. 17A is a perspective view of a rivet and a jig.

As illustrated in FIGS. 7B and 15B, when the concave-convex member 4 is placed at the desired position in the roller body 11, the concave-convex member 4 is secured to the roller body 11 by the rivet 35 (fastening element) shown in FIG. 17A.

The rivet 35 is described hereinafter.

As illustrated in FIG. 17A, the rivet 35 has an umbrella head 35a and a cylindrical shank 35b. The inside of the shank 35b is provided with a space 37. An opening communicating with the space 37 is formed at the end portion of the shank 35b. That is, the end of the shank 35b is provided with an annular opening edge 40.

The rivet 35 can be a self-piercing rivet available from FUKUI BYORA CO., LTD., which is made of a material such as high carbon steel, stainless steel, or aluminum.

The rivet 35 can fasten two members together using a jig 36a. The jig 36a has a support surface 34. The support surface 34 is a plane or a curved surface conforming to the concave surface 16 on the inner peripheral side of the arc-like protrusion 7 of the concave-convex member 4. The support surface 34 is provided with a blind hole 48. The center of the blind hole 48 is provided with a protrusion 49. The protrusion 49 has a particular shape such as a cone and is tapered. That is, the cross-sectional diameter of a connecting portion at which the protrusion 49 intersects the blind hole 48 is larger than the inner diameter of the shank 35b.

Figure 18A:
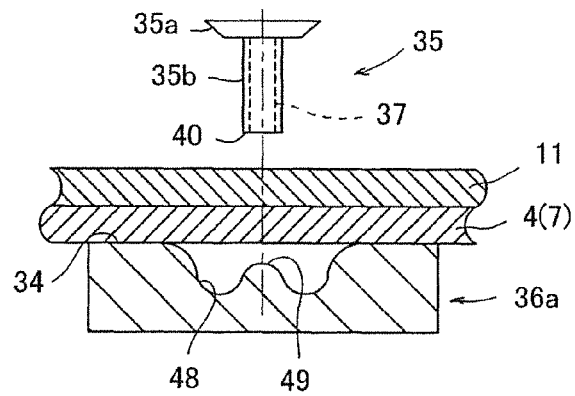
FIGS. 18A-18D are sectional views illustrating how the rivet is deformed when the rivet is driven toward the jig shown in FIG. 17A.
Figure 18B:
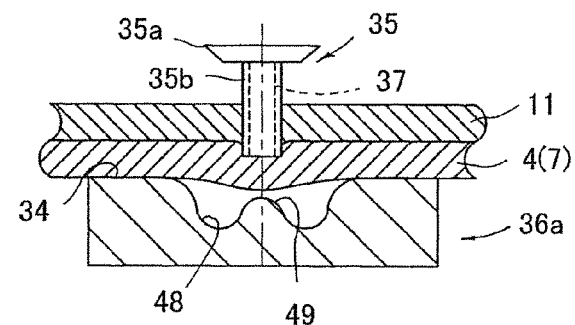
Figure 18C:
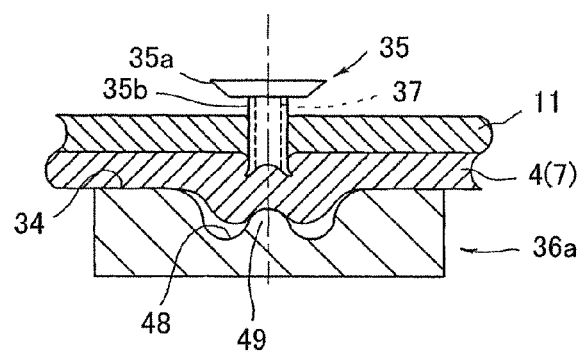
Figure 18D:
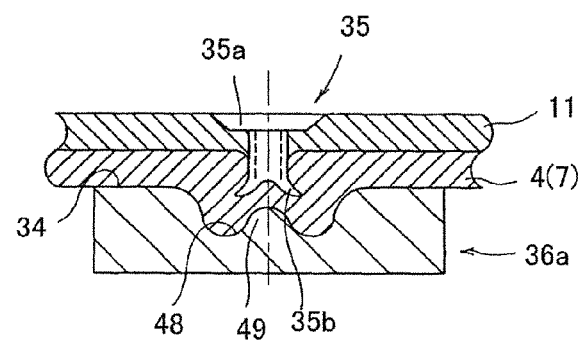

As illustrated in FIG. 18A, the space 37 is aligned with the end of the protrusion 49 with the opening edge 40 of the space 37 of the shank 35b of the rivet 35 opposed to the end side of the protrusion 49 of the jig 36a. When the head 35a of the rivet 35 is then struck with a hammer or the like (not shown), the shank 35b of the rivet 35 penetrates the roller body 11 and recesses the concave-convex member 4 as illustrated in FIG. 18B. The opening edge 40 of the shank 35b is further pressed against a base end of the protrusion 49 larger than the inner diameter of the shank 35b through the concave-convex member 4. As a result, the shank 35b of the rivet 35 is broken from its end side to be expanded as illustrated in FIGS. 18C-18D.

Figure 17B:
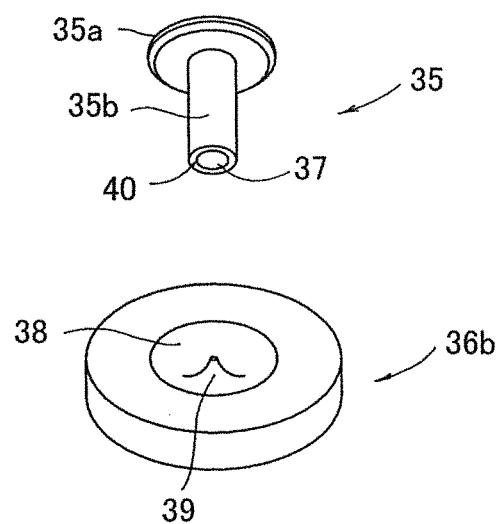
FIG. 17B is a perspective view of the rivet and a different jig from that shown in FIG. 17A.

The rivet 35, which penetrates the roller body 11 and the concave-convex member 4, can fasten them together using a jig 36b shown in FIG. 17B. The jig 36b has a structure in which the central portion of a blind hole 38 formed on a flat plate is provided with a substantially conical protrusion 39.

Figure 19A:
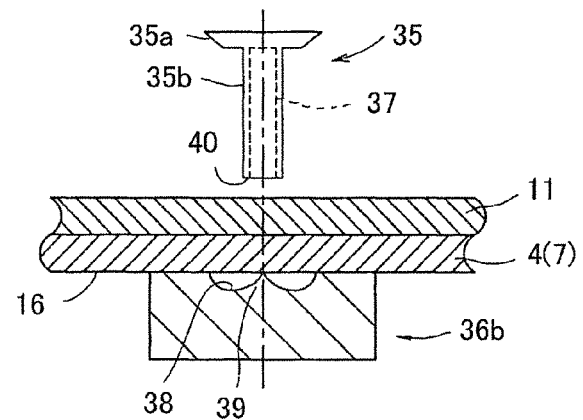
FIG. 19A-19D are sectional views illustrating how the rivet is deformed when the rivet is driven toward the jig shown in FIG. 17B.
Figure 19B:
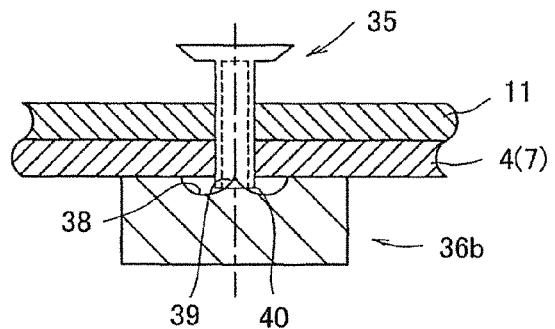

As illustrated in FIG. 19A, the jig 36b is disposed on the inner peripheral side of the concave-convex member 4 and the rivet 35 is disposed outside the roller body 11. The center of the shank 35b of the rivet 35 and the protrusion 39 of the jig 36b are aligned with each other. When the head 35a of the rivet 35 is struck with a hammer or the like (not shown), the rivet 35 penetrates the roller body 11 and the concave-convex member 4 as illustrated in FIG. 19B.

Figure 19C:
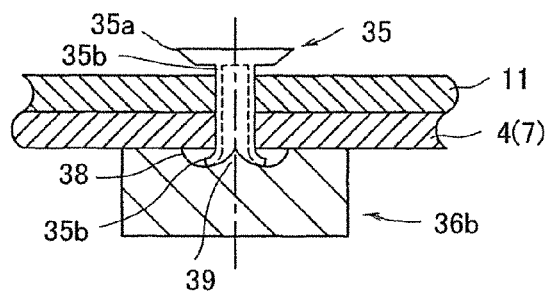
Figure 19D:
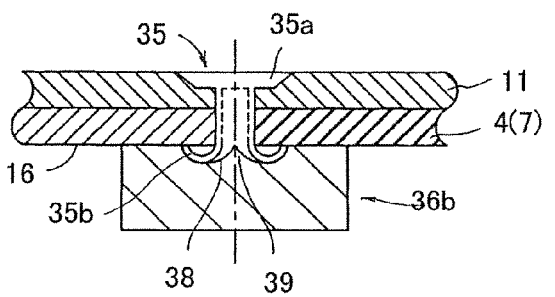

Further, as illustrated in FIGS. 19C-19D, the shank 35b of the rivet 35 is abutted against the blind hole 38 and the protrusion 39 of the jig 36b. Consequently, the shank 35b of the rivet 35 is broken from its end side to be expanded on the blind hole 38 so that the broken shank 35b engages with the concave surface 16 (i.e., the inner peripheral surface) of the concave-convex member 4. The head 35a of the rivet 35 engages with the outer peripheral surface of the roller body 11. Thus, the roller body 11 and the concave-convex member 4 are held between the head 35a and the broken shank 35b of the rivet 35.

Figure 7C:
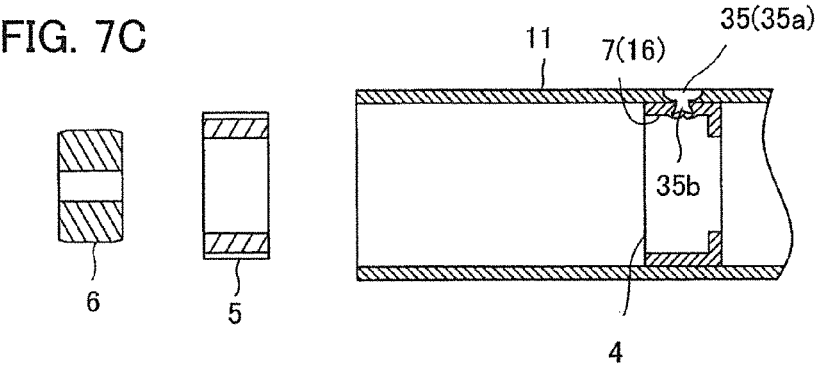
Figure 15C:
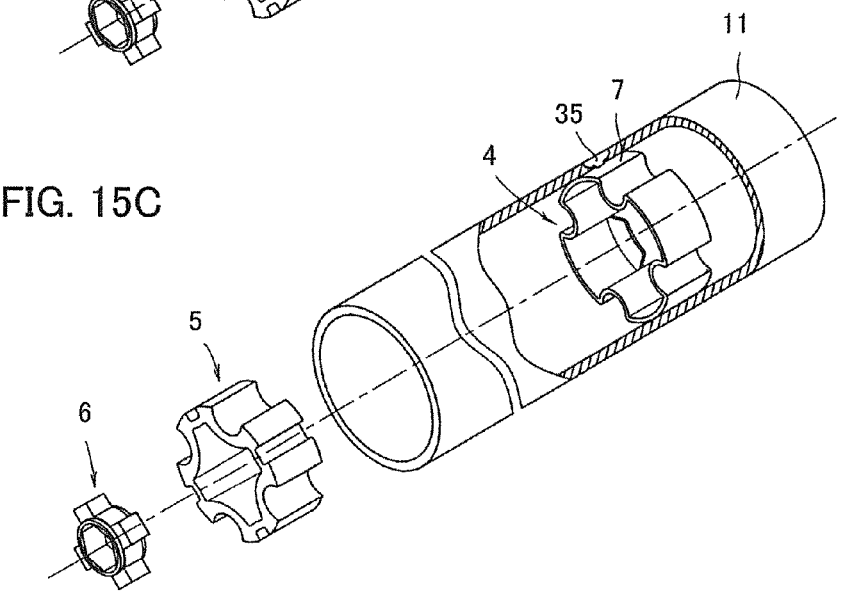

Referring back to FIG. 7B, the roller body 11 and the arc-like protrusion 7 of the concave-convex member 4 are fastened by the rivet 35. That is, the jig 36a is disposed within the intermediate member receiving region R1, is abutted on the concave surface 16 of the concave-convex member 4, and is opposed to the rivet 35 outside the roller body 11. When the head 35a of the rivet 35 is struck with a hammer or the like (not shown), the end of the shank 35b of the rivet 35 penetrates the roller body 11 and bites into the concave-convex member 4 (arc-like protrusion 7). Thereafter, the end of the shank 35b is broken inside the concave-convex member 4 (arc-like protrusion 7) to be expanded, and the roller body 11 and the concave-convex member 4 are secured together as illustrated in FIGS. 7C and 15C.

Figure 11B:
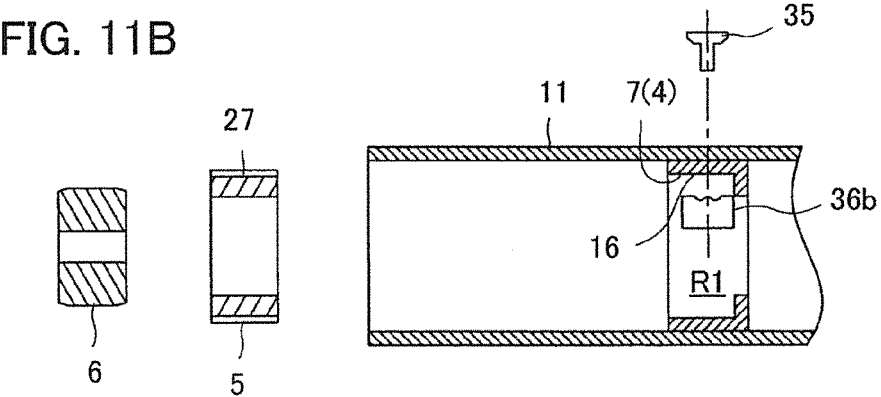
Figure 11C:
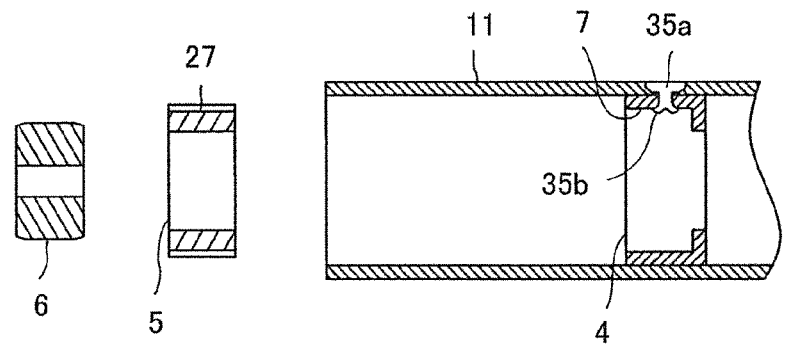

Alternatively, the roller body 11 and the arc-like protrusion 7 of the concave-convex member 4 are fastened by the rivet 35 as illustrated in FIG. 11B. That is, the jig 36b is disposed within the intermediate member receiving region R1, is abutted on the concave surface 16 of the concave-convex member 4, and is opposed to the rivet 35 outside the roller body 11. When the head 35a of the rivet 35 is struck with a hammer or the like (not shown), the shank 35b of the rivet 35 penetrates the roller body 11 and the concave-convex member 4 (arc-like protrusion 7) and the end of the shank 35b is abutted against the jig 36b to be broken. Consequently, the end of the shank 35b is expanded laterally on the blind hole 38 of the jig 36b, the head 35a of the rivet 35 makes close contact with the roller body 11, and broken portions of the shank 35b makes close contact with the inner peripheral surface of the arc-like protrusion 7 of the concave-convex member 4. That is, the roller body 11 and the concave-convex member 4 are secured together as illustrated in FIG. 11C.

Next, the intermediate member 5 is mounted in the concave-convex member 4 secured to the roller body 11, continued from FIGS. 7A-7C or FIGS. 11A-11C.

Figure 8A:
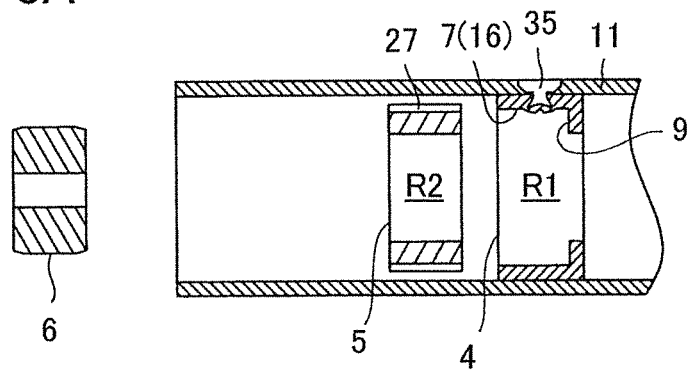
FIGS. 8A-8C, continued from FIGS. 7A-7C, are sectional views of the power transmission member to be mounted in the roller body and illustrate a procedure for mounting an intermediate member in the concave-convex member integrated with the roller body.
Figure 12A:
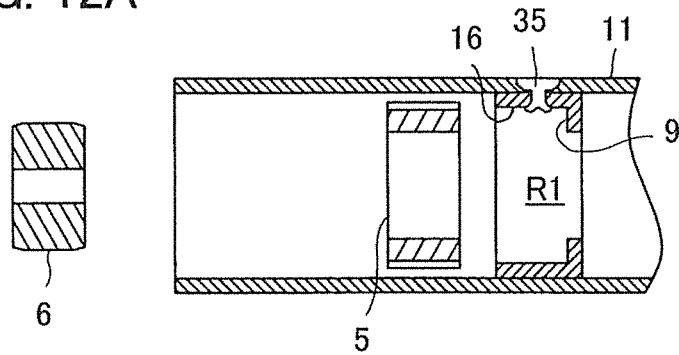
FIGS. 12A-12C, continued from FIGS. 11A-11C, are sectional views of the power transmission member to be mounted in the roller body and illustrate a procedure for mounting an intermediate member in the concave-convex member integrated with the roller body.

The outer diameter of the intermediate member 5 is smaller than the inner diameter of the roller body 11 as illustrated in FIG. 8A or 12A. As such, the intermediate member 5 can smoothly move in the roller body 11 and reach the position of the concave-convex member 4.

Figure 8B:
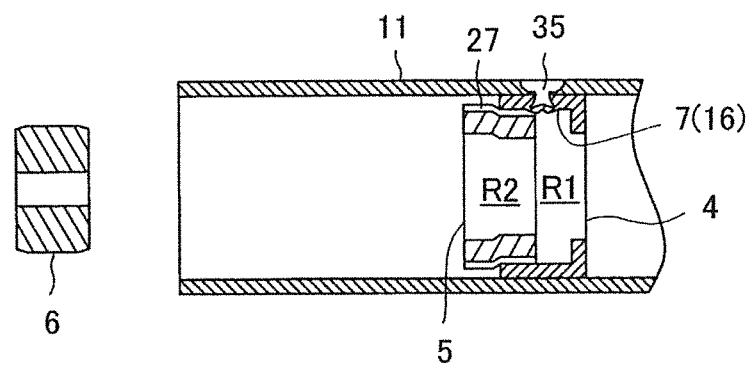
Figure 12B:
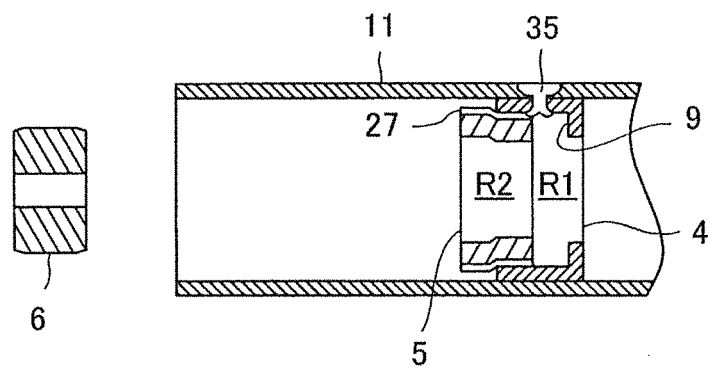

The intermediate member 5 is inserted into the intermediate member receiving region R1 of the concave-convex member 4 as illustrated in FIG. 8B or 12B. The intermediate member 5 is disposed within the intermediate member receiving region R1 while being elastically deformed. At that time, the protrusions 25 and the retraction portions 26 of the intermediate member 5 shown in FIGS. 6A-6B make close contact with the corresponding concave surfaces 16 and convex surfaces 18 of the concave-convex member 4, respectively. Consequently, the concave-convex member 4 and the intermediate member 5 are fit in a concave-convex manner and cannot rotate relative to each other.

The protrusion 25 of the intermediate member 5 has the groove 27 and the protrusion 25 elastically deforms so that the width of the groove 27 narrows. As illustrated in FIG. 10B, alignment of the groove 27 with the position of the rivet 35 prevents the intermediate member 5 from interfering with the rivet 35 or the concave-convex member 4 recessed by the rivet 35 and facilitates placement of the intermediate member 5 within the concave-convex member 4.

Figure 8C:
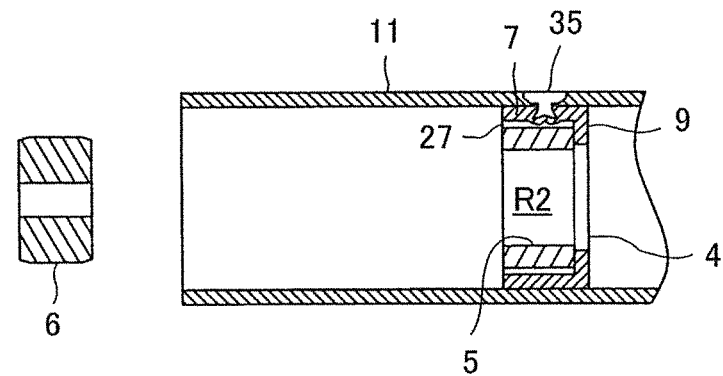
Figure 12C:
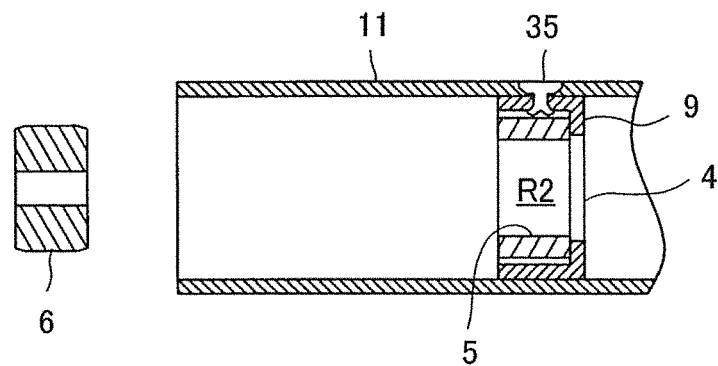

The intermediate member 5, which has entered the intermediate member receiving region R1, abuts against the inner protrusion 9 of the concave-convex member 4 to stop and is securely disposed within the intermediate member receiving region R1 as illustrated in FIG. 8C or 12C.

Finally, the engagement member 6 is mounted in the engagement member receiving region R2 of the intermediate member 5, continued from FIGS. 8A-8C or FIGS. 12A-12C.

Figure 9A:
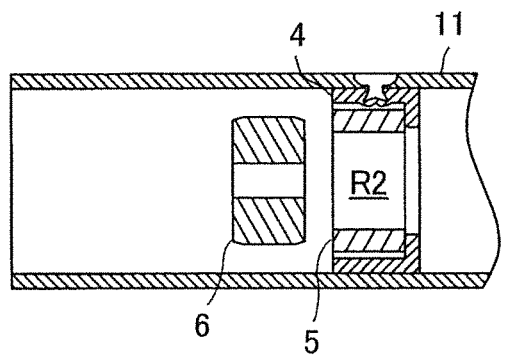
FIGS. 9A-9C, continued from FIGS. 8A-8C, are sectional views of the power transmission member to be mounted in the roller body and illustrate a procedure for mounting an engagement member in the intermediate member integrated with the roller body.
Figure 13A:
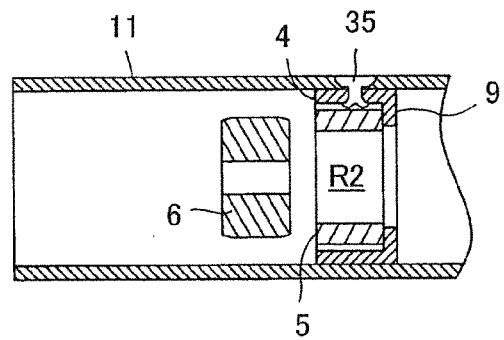
FIGS. 13A-13C, continued from FIGS. 12A-12C, are sectional views of the power transmission member to be mounted in the roller body and illustrate a procedure for mounting an engagement member in the intermediate member integrated with the roller body.
Figure 16A:
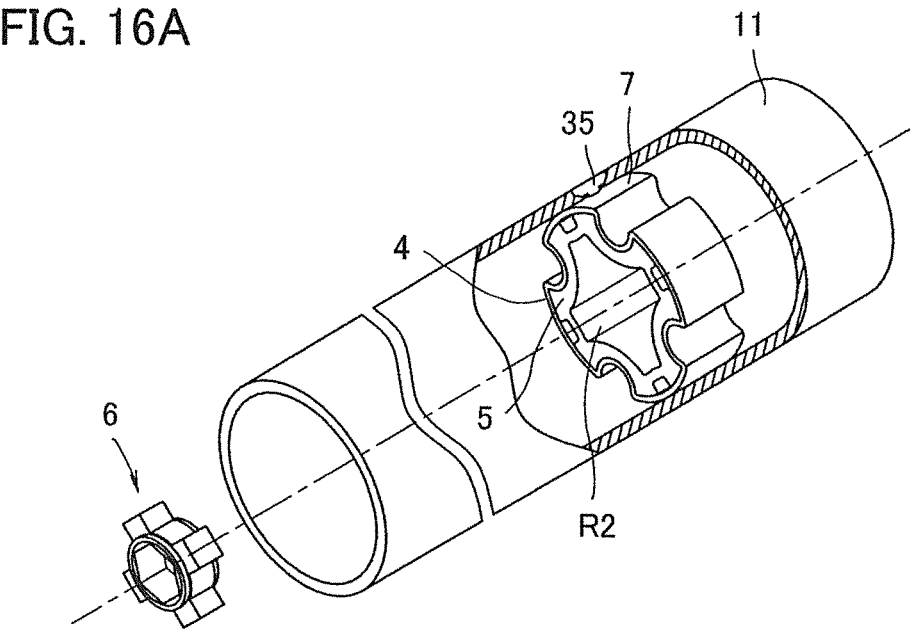
FIGS. 16A-16B are partially sectional perspective views of the power transmission member to be mounted in the roller body and illustrate the procedure for mounting the engagement member in the roller body.

Since the outer diameter of the engagement member 6 is smaller than the inner diameter of the roller body 11 as illustrated in FIGS. 9A, 13A, and 16A, the engagement member 6 can easily move in the roller body 11 and quickly reach the position of the intermediate member 5.

Figure 9B:
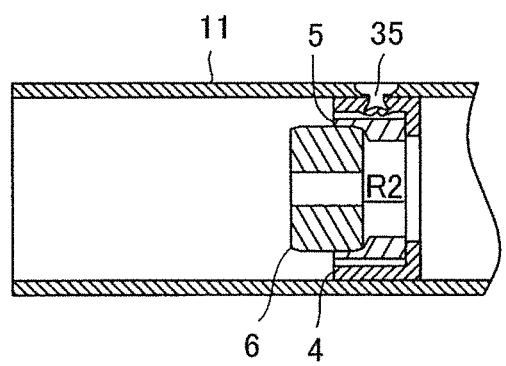
Figure 9C:
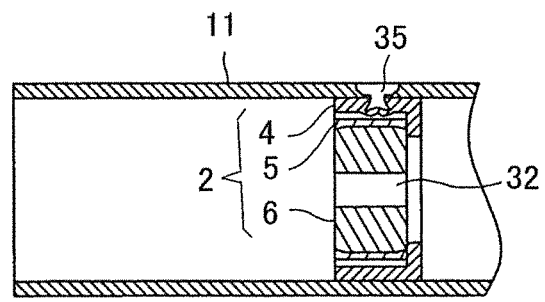
Figure 13B:
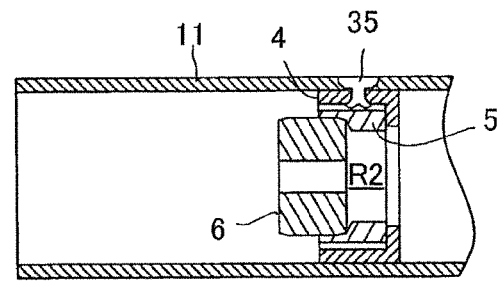
Figure 13C:
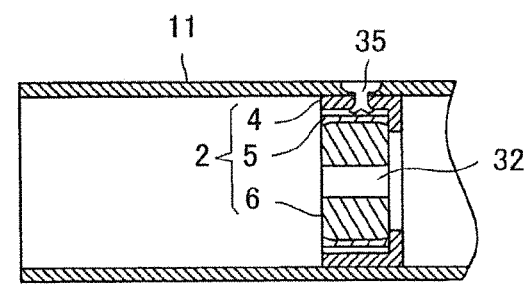
Figure 16B:
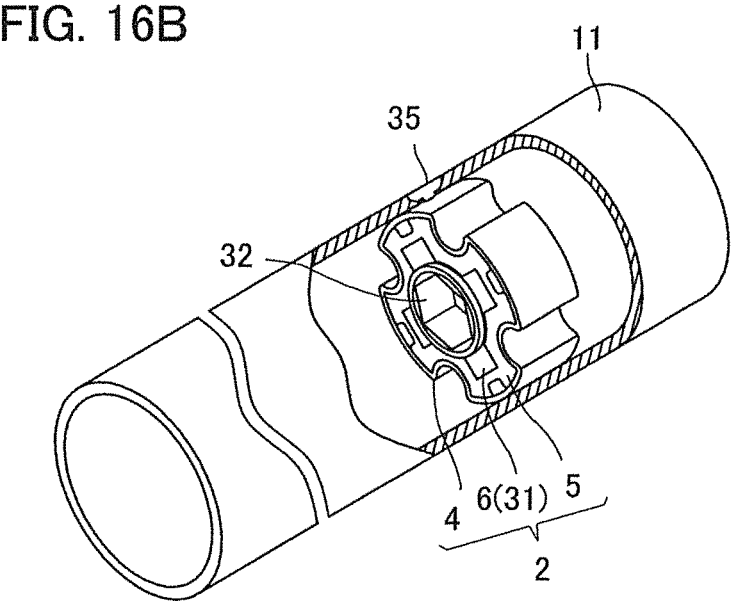

The engagement member 6 is then press-fit into the engagement member receiving region R2 of the intermediate member 5 as illustrated in FIGS. 9B and 13B. At that time, the intermediate member 5 undergoes elastic deformation and the engagement member 6 is disposed within the engagement member receiving region R2 as illustrated in FIGS. 9C, 13C, and 16B.

The protrusions 31 of the engagement member 6 engage with the corresponding concave portions 28 of the intermediate member 5. As such, the engagement member 6 and the intermediate member 5 cannot rotate relative to each other.

The concave-convex member 4 has the elastically deformable intermediate member 5 so that the position of the engagement member 6 can be fine-tuned. In other words, the elastic deformation of the intermediate member 5 allows the position of the engagement member 6 to be moved.

Figure 10A:
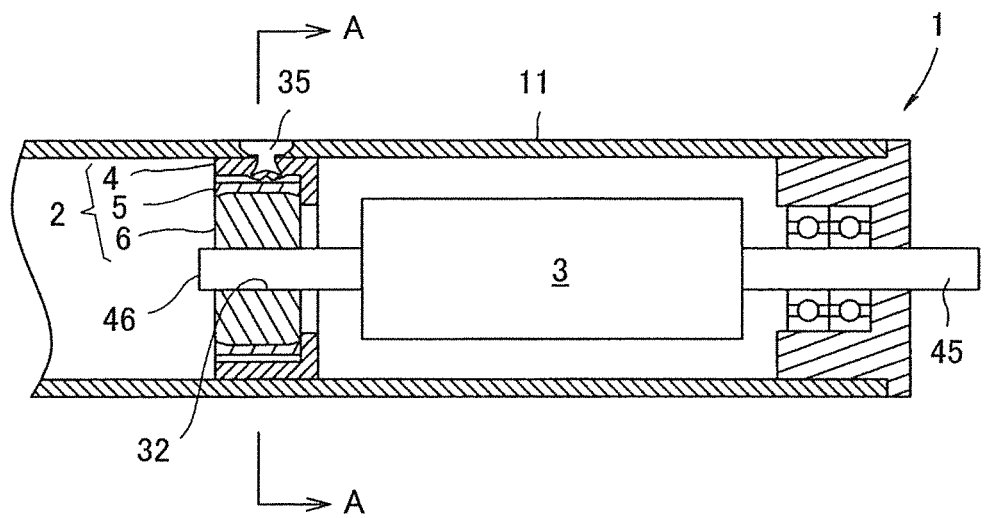
FIG. 10A is a partially sectional view of the motor-incorporating roller, where the power transmission member mounted in the roller body according to the procedures shown in FIGS. 7A to 9C engages with a power unit.
Figure 10B:
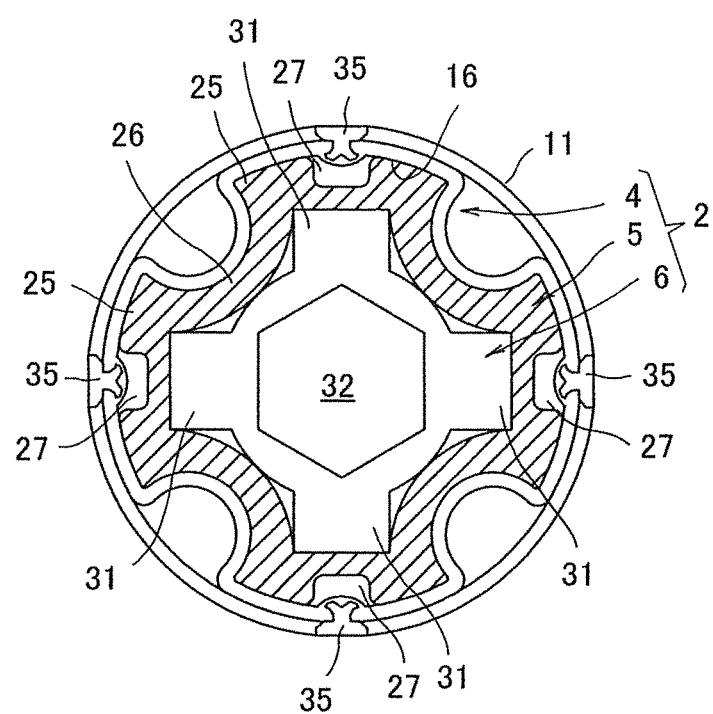
FIG. 10B is a sectional view from an arrow AA of FIG. 10A.
Figure 14:
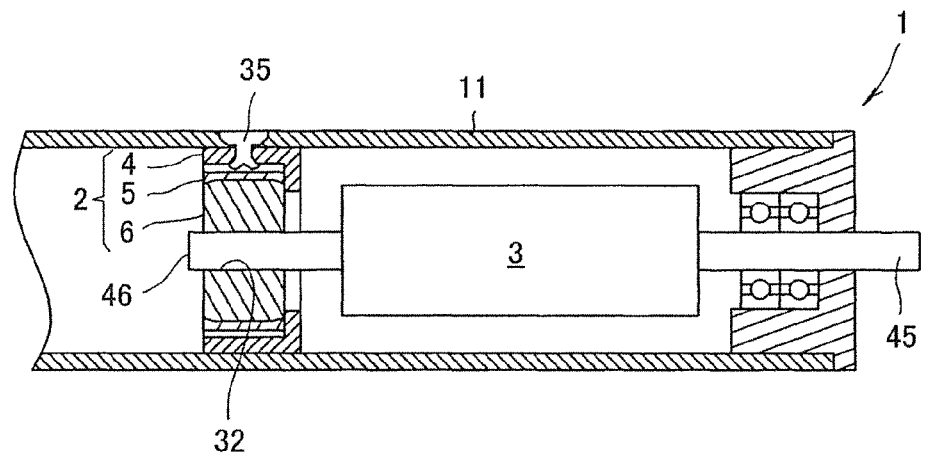
FIG. 14 is a partially sectional view of the motor-incorporating roller, where the power transmission member mounted in the roller body according to the procedures shown in FIGS. 11A to 13C engages with a power unit.

Specifically, even if the center of the power transmission member 2 secured to the roller body 11 does not coincide with the center of the roller body 11 under natural conditions, the drive-side shaft 46 (output shaft) can be inserted into the shaft insertion hole 32 of the engagement member 6 as illustrated in FIGS. 10A and 14 by elastically deforming the intermediate member 5.

When the drive-side shaft 46, having a hexagonal cross-section, is inserted into the shaft insertion hole 32 or a hexagonal hole, they are integrated so as not to rotate relative to each other.

A structure for securing the power transmission member 2 and the roller body 11 together is as follows.

The intermediate member 5 is fit in the concave-convex member 4 (the intermediate member receiving region R1), and the intermediate member 5 and the concave-convex member 4 cannot rotate relative to each other.

Further, the engagement member 6 is fit in the intermediate member 5 (the engagement member receiving region R2), and the engagement member 6 and the intermediate member 5 cannot rotate relative to each other.

Furthermore, the roller body 11 and the four arc-like protrusions 7 of the concave-convex member 4 are securely fastened by the rivets 35 so that the roller body 11 and the power transmission member 2 are firmly secured to each other and cannot rotate relative to each other. Note that if the roller body 11 and at least one arc-like protrusion 7 are securely fastened by the rivet 35, the roller body 11 and the concave-convex member 4 cannot rotate relative to each other.

Since the engagement member 6 and the roller body 11 cannot rotate relative to each other, a rotational force of the power unit 22 is reliably transmitted to the roller body 11 through the engagement member 6, the intermediate member 5, and the concave-convex member 4. When the drive-side shaft 46 of the power unit 22 rotates, the roller body 11 rotates together therewith.

Figure 20A:
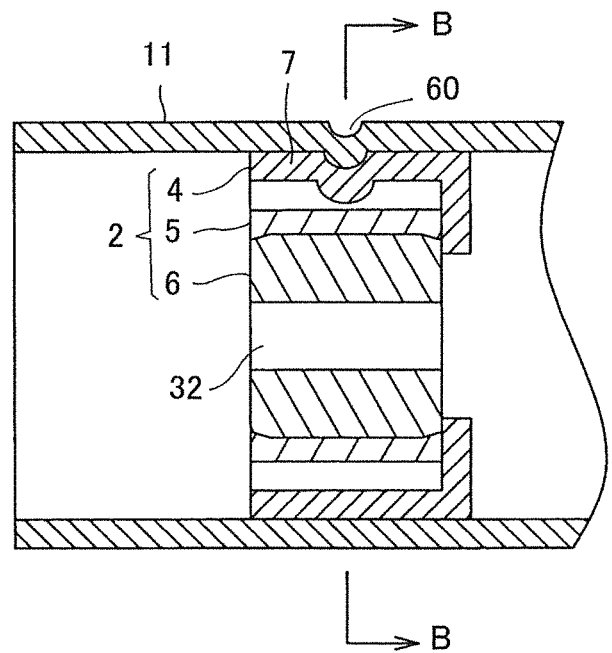
FIG. 20A is a partially sectional view of the roller body and the concave-convex member, illustrating the roller body and concave-convex member joined by mechanical engagement obtained by caulking the roller body.
Figure 20B:
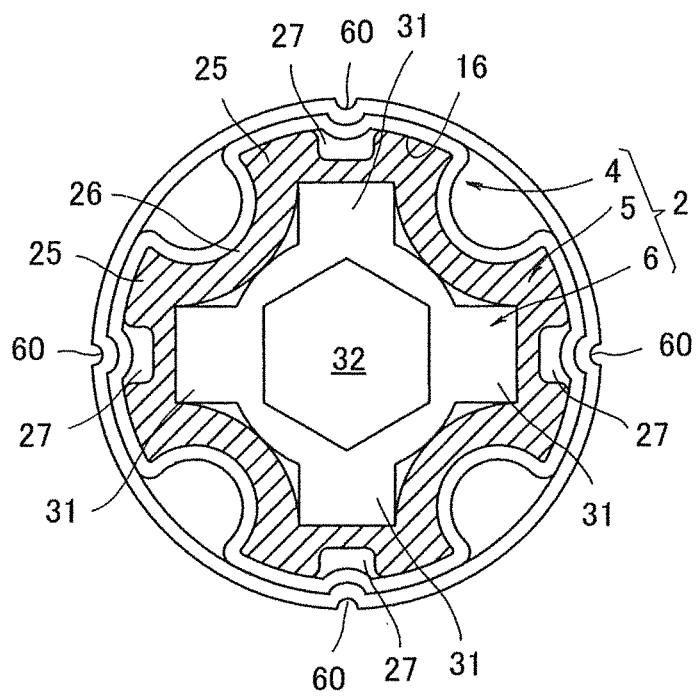
FIG. 20B is a sectional view from an arrow BB of FIG. 20A.

While the power transmission member 2 and the roller body 11 are securely fastened by the rivets 35 in the above-described example, the roller body 11 and the concave-convex member 4 of the power transmission member 2 can be secured together using mechanical engagement. That is, caulking portions 60, caulked by strongly striking specific parts of the roller body 11, are provided as illustrated in FIGS. 20A-20B. The provision of the caulking portions 60 causes the arc-like protrusions 7 of the concave-convex member 4 of the power transmission member 2 to be partially recessed. Thus, the roller body 11 and the concave-convex member 4 can be integrated so as not to rotate relatively to each other.

The power transmission member 2 is integrally secured to the roller body 11 as described above. Therefore, the power transmission member 2 can be firmly secured to the roller body 11 compared to a securing method relying on friction.

Furthermore, even if there is variation in the inner diameter of the roller body 11 due to a manufacturing error, the roller body 11 and the power transmission member 2 is firmly secured together by the rivets 35 (fastening element) or caulking (mechanical engagement). In this case, if the center of the roller body 11 and the center of the power transmission member 2 (i.e., the center of the shaft insertion hole 32 of the engagement member 6) are not coincident, the elastic deformation of the intermediate member 5 allows the center of the shaft insertion hole 32 of the engagement member 6 to be aligned with the center of the roller body 11.

Figure 22A:
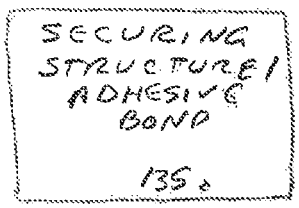
FIGS. 22A and 22B are schematic representations of alternative securing structures between the concave-convex member and roller body.
Figure 22B:
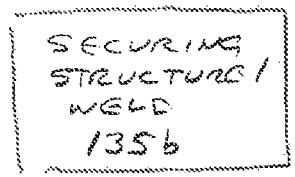

The power transmission members 2 and 62 (i.e., concave-convex member 4 and connecting member 64) may be secured to the roller body 11 by adhesive bonding or welding instead of using the rivet 35 (fastening element) or the crimp (mechanical engagement) as described above. That is, the inner peripheral surface 11a of the roller body 11 and the concave-convex member 4 (connecting member) of the power transmission members 2 or the connecting member 64 of the power transmission member 62 may be secured together by adhesive bonding or spot welding, as depicted schematically at 135a and 135b in FIGS. 22A and 22B, respectively.

Moreover, the roller body 11 and the power transmission members 2, 62 (i.e., concave-convex member 4 and connecting member 64) may be secured together by a combination of at least two of bonding, welding, fastening element, and mechanical engagement with the power transmission members 2, 62 obtained by recessing the roller body 11.

Figure 21:
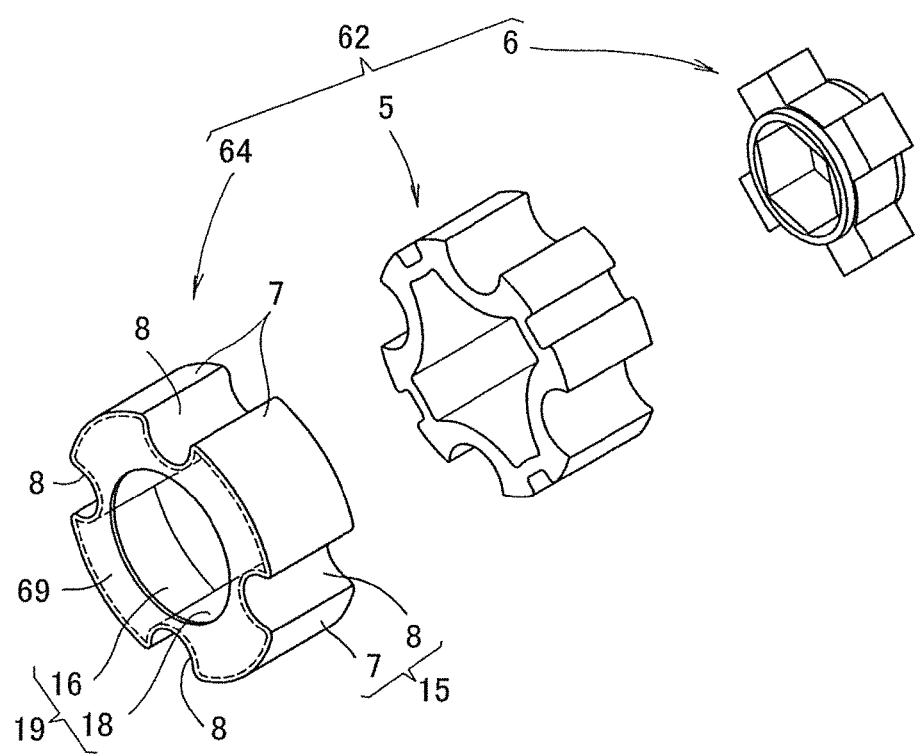
FIG. 21 is an exploded perspective view of a different power transmission member from that shown in FIG. 6B.

A connecting member 64 of a power transmission member 62 shown in FIG. 21 can be used instead of the concave-convex member 4 (connecting member) of the power transmission member 2 shown in FIGS. 6A and 6B. The power transmission member 62 includes a connecting member 64, an intermediate member 5, and an engagement member 6. The intermediate member 5 and the engagement member 6 of the power transmission member 62 are the same as the intermediate member 5 and the engagement member 6 of the power transmission member 2, respectively.

The connecting member 64 has a structure substantially identical to the concave-convex member 4, where the same elements are denoted by the same reference numerals and redundant descriptions are omitted.

The connecting member 64 has a flange 69 that is configured such that the inner protrusions 9 adjacent to one another are arranged continuously instead of the inner protrusions 9 of the concave-convex member 4. The flange 69 is an inward flange having a hole 69a and is formed around the entire circumference of the annular portion 15 of the connecting member 64. That is, the outer peripheral portion of the flange 69 is contiguous with the annular portion 15 around the entire circumference. Since the flange 69 increases the rigidity of the connecting member 64, the connecting member 64 would be less likely to deform if an external force is applied radially.

Also, since the outer peripheral portion of the flange 69 is contiguous with the annular portion 15 around the entire circumference, the flange 69 would be less likely to deform if a force in the normal direction is applied to the flange 69. That is, even if the intermediate member 5 is pressed and a load in the normal direction is applied to the flange 69 when the intermediate member 5 is disposed within the intermediate member receiving region R1, the flange 69 is less likely to deform. Thus, the intermediate member 5 is securely disposed within the intermediate member receiving region R1.

The invention claimed is:

1. A motor-incorporating roller comprising:
   a hollow roller body;
   a power unit including a motor; and
   a power transmission member,
   the power unit and the power transmission member being contained within the roller body, and a rotational force of the power unit being transmitted to the roller body through the power transmission member,
   wherein the power transmission member comprises:
   a connecting member that includes an annular portion, part or all of the outer peripheral surface thereof is provided with an arc-like portion, and the inner peripheral surface thereof is provided with a concave-convex portion;
   an intermediate member having elasticity; and
   an engagement member including an outer engagement portion and an inner engagement portion,
   wherein the connecting member, the intermediate member, and the engagement member are separate from the roller body,
   wherein the arc-like portion on the outer peripheral surface of the connecting member is in contact with the inner peripheral surface of the roller body, and the connecting member is secured within the roller body by securing structure that is at least one of bonding, welding, a fastening element, and mechanical engagement obtained by recessing the roller body and provided at a region where the outer peripheral surface of the connecting member and inner peripheral surface of the roller body are in contact,
   wherein the intermediate member engages with the concave-convex portion of the connecting member and the outer engagement portion of the engagement member to maintain the inner engagement portion of the engagement member at the center of the roller body, and
   wherein the power unit engages with the inner engagement portion of the engagement member.

2. The motor-incorporating roller according to claim 1, wherein the connecting member is inwardly deformable.

3. The motor-incorporating roller according to claim 1, wherein the annular portion of the connecting member comprises:
   a plurality of the arc-like portions each of which is arranged at a plurality of positions on the same circumference; and
   a plurality of recesses each of which is recessed radially inwardly from the annular portion, and
   wherein the arc-like portions adjacent to each other are connected by the recess.

4. The motor-incorporating roller according to claim 1, wherein the fastening element is a rivet.

5. The motor-incorporating roller according claim 1, wherein the connecting member comprises an inner protrusion that is contiguous with at least the arc-like portion of the annular portion and extends radially inwardly.

6. The motor-incorporating roller according to claim 1, wherein the annular portion of the connecting member comprises:

a plurality of arc-like portions that are provided with an inner wall contiguous with the arc-like portion at an axial end thereof and that extend radially inwardly; and a plurality of recesses which are provided with no inner wall, or an inner wall smaller than that of the arc-like portion, and wherein the arc-like portions and the recesses are annularly connected.

7. The motor-incorporating roller according to claim 1, wherein the annular portion of the connecting member comprises:

a plurality of arc-like portions; and a plurality of recesses more easily elastically deformable compared to the arc-like portion, and wherein the arc-like portions and the recesses are annularly connected.

8. The motor-incorporating roller according to claim 1, wherein the annular portion of the connecting member comprises a plurality of arc-like portions and a plurality of recesses, the arc-like portions and the recesses are annularly connected, and the recess is arc-like in shape.

9. The motor-incorporating roller according to claim 1, wherein the connecting member is disposed within the roller body with the annular portion being radially compressed.

10. The motor-incorporating roller according to claim 1, wherein the outer peripheral surface of the intermediate member is provided with a plurality of protrusions protruding radially outwardly and a plurality of retraction portions retracting radially inwardly, and the protrusions adjacent to each other are connected by the retraction portion, and wherein the protrusion and the retraction portion of the intermediate member engage with the corresponding concave-convex portion of the connecting member.

11. A motor-incorporating roller comprising:

a hollow roller body;

a power unit including a motor; and a power transmission member, the power unit and the power transmission member being contained within the roller body, and a rotational force of the power unit being transmitted to the roller body through the power transmission member, wherein the power transmission member comprises:

a connecting member that includes an annular portion, part or all of the outer peripheral surface thereof is provided with an arc-like portion, and the inner peripheral surface thereof is provided with a concave-convex portion;

an intermediate member having elasticity; and an engagement member including an outer engagement portion and an inner engagement portion, wherein the connecting member, the intermediate member, and the engagement member are separate from the roller body, wherein the arc-like portion on the outer peripheral surface of the connecting member is in contact with the inner peripheral surface of the roller body, and the connecting member is secured within the roller body by securing structure that is at least one of bonding, welding, a fastening element, and mechanical engagement obtained by recessing the roller body and provided at a region where the outer peripheral surface of the connecting member and inner peripheral surface of the roller body are in contact, wherein the intermediate member engages with the concave-convex portion of the connecting member and the outer engagement portion of the engagement member to maintain the inner engagement portion of the engagement member at the center of the roller body, wherein the power unit engages with the inner engagement portion of the engagement member, wherein the annular portion of the connecting member comprises:

a plurality of arc-like portions that are provided with an inner wall contiguous with the arc-like portion at an axial end thereof and that extend radially inwardly; and a plurality of recesses which are provided with no inner wall, or an inner wall smaller than that of the arc-like portion, wherein the arc-like portions and the recesses are annularly connected, and wherein the connecting member is inwardly deformable.

12. The motor-incorporating roller according to claim 11, wherein the recesses are more easily elastically deformable compared to the arc-like portion.

13. The motor-incorporating roller according to claim 11, wherein the recess is arc-like in shape.

14. The motor-incorporating roller according to claim 11, wherein the connecting member is disposed within the roller body with the annular portion being radially compressed.

15. A power transmission member that is contained within a hollow roller body of a motor-incorporating roller and transmits a rotational force from an output shaft of a power unit including a motor disposed within the roller body to the roller body, the power transmission member comprising:

a connecting member that includes an annular portion, part or all of the outer peripheral surface thereof is provided with an arc-like portion, and the inner peripheral surface thereof is provided with a concave-convex portion;

an intermediate member having elasticity; and an engagement member including an outer engagement portion and an inner engagement portion, wherein the connecting member, the intermediate member, and the engagement member are separate from the roller body, wherein the arc-like portion on the outer peripheral surface of the connecting member is in contact with the inner peripheral surface of the roller body, and the connecting member is secured within the roller body by securing structure that is at least one of bonding, welding, a fastening element, and mechanical engagement obtained by recessing the roller body and provided at a region where the outer peripheral surface of the connecting member and inner peripheral surface of the roller body are in contact, wherein the intermediate member engages with the concave-convex portion of the connecting member and the outer engagement portion of the engagement member to maintain the inner engagement portion of the engagement member at the center of the roller body, and wherein the power unit engages with the inner engagement portion of the engagement member.

16. The power transmission member according to claim 15, wherein the annular portion of the connecting member comprises:

a plurality of the arc-like portions arranged at a plurality of positions on the same circumference; and a plurality of recesses each of which is recessed radially inwardly from the annular portion, and wherein the arc-like portions adjacent to each other are connected by the recess.

17. The power transmission member according to claim 15,
wherein the connecting member comprises an inner protrusion that is contiguous with at least the arc-like portion of the annular portion and extends radially inwardly.

18. The power transmission member according to claim 15,
wherein the annular portion of the connecting member comprises:
a plurality of arc-like portions that are provided with an inner wall contiguous with the arc-like portion at an axial end thereof and that extend radially inwardly; and
a plurality of recesses which are provided with no inner wall, or an inner wall smaller than that of the arc-like portion, and
wherein the arc-like portions and the recesses are annularly connected.

19. The power transmission member according to claim 15,
wherein the annular portion of the connecting member comprises a plurality of arc-like portions and a plurality of recesses, the arc-like portions and the recesses are annularly connected, and each of the recesses is easily elastically deformable compared to the arc-like portion.

20. The power transmission member according to claim 15,
wherein the annular portion of the connecting member comprises a plurality of arc-like portions and a plurality of recesses, the arc-like portions and the recesses are annularly connected, and each of the recesses is arc-like in shape.

* * * * *